(12) United States Patent
Kanougi et al.

(10) Patent No.: US 9,248,408 B2
(45) Date of Patent: Feb. 2, 2016

(54) HOLLOW-FIBER ELEMENT FOR ORGANIC-VAPOR SEPARATION

(75) Inventors: Tomonori Kanougi, Ichihara (JP); Yuma Irisa, Ichihara (JP); Kenji Fukunaga, Ichihara (JP)

(73) Assignee: UBE INDUSTRIES, LTD., Yamaguchi (JP)

( * ) Notice: Subject to any disclaimer, the term of this patent is extended or adjusted under 35 U.S.C. 154(b) by 1011 days.

(21) Appl. No.: 13/262,158

(22) PCT Filed: Mar. 31, 2010

(86) PCT No.: PCT/JP2010/055822
§ 371 (c)(1),
(2), (4) Date: Sep. 29, 2011

(87) PCT Pub. No.: WO2010/114010
PCT Pub. Date: Oct. 7, 2010

(65) Prior Publication Data
US 2012/0031831 A1    Feb. 9, 2012

(30) Foreign Application Priority Data

Mar. 31, 2009 (JP) ................................. 2009-086876
Nov. 9, 2009 (JP) ................................. 2009-255807

(51) Int. Cl.
*B01D 63/02*    (2006.01)
(52) U.S. Cl.
CPC .............. *B01D 63/02* (2013.01); *B01D 63/022* (2013.01); *B01D 63/023* (2013.01); *B01D 2313/08* (2013.01)
(58) Field of Classification Search
None
See application file for complete search history.

(56) References Cited

U.S. PATENT DOCUMENTS

| 4,323,453 | A | * | 4/1982 | Zampini ................... 210/321.61 |
| 4,323,454 | A | * | 4/1982 | Fritzsche et al. ......... 210/321.61 |
| 4,800,019 | A | * | 1/1989 | Bikson et al. .............. 210/321.8 |
| 4,853,127 | A | * | 8/1989 | Le et al. .................... 210/500.39 |

(Continued)

FOREIGN PATENT DOCUMENTS

| JP | S63-267415 | 11/1988 |
| JP | H02-031821 | 2/1990 |

(Continued)

OTHER PUBLICATIONS

PCI—Paint and Coating Industry: amine curing epoxy resins . . . Jun. 2006.*

(Continued)

*Primary Examiner* — Krishnan S Menon
(74) *Attorney, Agent, or Firm* — Nixon Peabody LLP; Jeffrey L. Costellia

(57) ABSTRACT

In a hollow fiber element constituting a separation membrane module for separating an organic vapor, at least one end part of a fiber bundle consisting of multiple hollow fiber membranes having a selective permeability is fixed and bound with a tube sheet formed by a cured material, in which an epoxy composition (A) has been cured by using a hardener (B). A glass transition temperature of said cured material is not less than 160° C., a minimum elongation at break thereof is not less than 7.0%, and an elution ratio thereof is less than 5%. For this reason, the hollow fiber element has enough endurance to retain a gas-tightness of an internal space of the hollow fiber membrane and an external space of the hollow fiber membrane even in use under organic vapor with an elevated temperature and high pressure.

9 Claims, 1 Drawing Sheet

(56) References Cited

U.S. PATENT DOCUMENTS

| | | | |
|---|---|---|---|
| 5,284,584 A * | 2/1994 | Huang et al. | 210/321.61 |
| 5,472,601 A | 12/1995 | Eguchi | |
| 5,753,008 A * | 5/1998 | Friesen et al. | 95/45 |
| 6,210,464 B1 | 4/2001 | Nakanishi et al. | |
| 6,838,176 B2 * | 1/2005 | Goto et al. | 428/413 |
| 2003/0159583 A1 * | 8/2003 | Macheras et al. | 96/8 |
| 2009/0095675 A1 * | 4/2009 | Runneboom et al. | 210/615 |
| 2011/0111663 A1 * | 5/2011 | Kawamoto et al. | 442/175 |

FOREIGN PATENT DOCUMENTS

| | | |
|---|---|---|
| JP | H02-218714 | 8/1990 |
| JP | H04-171018 | 6/1992 |
| JP | H05-057152 | 3/1993 |
| JP | H06-296834 | 10/1994 |
| JP | H08-323157 | 12/1996 |
| JP | 2000-262838 | 9/2000 |

OTHER PUBLICATIONS

International Search Report issued in PCT Application No. PCT/JP2010/055822.

PCT Notification of Transmittal of English Translation of the International Preliminary Report on Patentability (Chapter 1) mailed Nov. 24, 2011.

* cited by examiner

HOLLOW-FIBER ELEMENT FOR ORGANIC-VAPOR SEPARATION

TECHNICAL FIELD

The present invention relates to a hollow fiber element for organic vapor separation, in which a fiber bundle consisting of multiple hollow fiber membranes having the selective permeability is fixed together with the tube sheet of the cured product of specific epoxy resin composition, and the method for producing the hollow fiber element. The present invention also relates to the gas separation membrane module for organic vapor separation housing the above-mentioned hollow fiber element in a vessel. The present invention furthermore relates to a method for organic vapor separation by employing the above-mentioned gas separation membrane module.

BACKGROUND ART

Methods using a separation membrane having the selective permeability has been drawn to attention for separating the organic vapor mixture produced by heating and vaporizing a liquid mixture containing organic compounds (the organic vapor separation). The gas separation membrane module used in this method includes plate and frame types, tubular types, hollow fiber types and the like. Among them, the hollow fiber type gas separation membrane module is industrially advantageous and is used extensively because not only it has beneficially the largest area of a membrane per unit volume but also it is excellent in pressure resistance and self-supporting.

The hollow fiber type gas separation membrane modules has the hollow fiber element, wherein at least one end of the fiber bundle consisting of multiple hollow fiber membranes having the selective permeability is fixed and bound together with a plate (tube sheet) of a cured resin of cast molding, and the fiber bundle is housed in a vessel equipped with at least a mixed gas inlet, a permeate gas outlet and a non-permeate gas outlet. Besides it functions to fix the fiber bundle together in a single body, the tube sheet has another function to partition the internal space of the hollow fiber membrane from its external space, and to retain the gas-tightness of the internal space and external space by sealing between the hollow fibers and between the hollow fibers and the vessel. The hollow fiber type gas separation membrane module would fail to perform suitable separation if the gas-tightness by the tube sheet were lost.

The organic vapor separation by using the hollow fiber type gas separation membrane module is carried out as follows. The organic vapor mixture produced by heating and vaporizing a liquid mixture containing organic compounds is supplied to the gas separation membrane module from a feed gas inlet. While the organic vapor mixture flows and contacts the hollow fiber membrane, the permeate vapor that has permeated the hollow fiber membrane is separated from the non-permeate vapor that has not permeated the hollow fiber membrane. The permeate vapor is collected from the permeate gas outlet and the non-permeate vapor is collected from the non-permeate gas outlet. Since the hollow fiber membrane has the selective permeability, the permeate vapor is rich in a component with higher permeance (the higher permeable component) and the non-permeate vapor has less such component. As a result, the organic vapor mixture is separated into the permeate vapor rich in the higher permeable component and the non-permeate vapor with less of the higher permeable component.

As the organic vapor separation by using the hollow fiber type gas separation membrane module, for example, the patent document 1 proposes a method for purifying and collecting a high-purity organic compound by dehydrating an aqueous solution containing the organic compound. The aqueous solution containing the organic compound is initially heated and vaporized to produce an organic vapor mixture comprising the vapor of the organic compound and the water vapor, and next the organic vapor mixture is fed to contact one side of the hollow fiber type gas separation membrane (hollow fiber membrane) made from aromatic polyimide at a temperature not lower than 70° C. While organic vapor mixture flows, the water vapor is selectively separated by permeation, whereby the organic vapor mixture with a reduced content of the water vapor is obtained.

The patent document 2 proposes a method for effectively dehydrating a water-organic vapor with a relatively small area. The effective dehydration is achieved by using a gas separation membrane module, in which the circumferential part of the hollow fiber bundle is covered with a film-form substance.

As a resin for cast molding used in the application of the tube sheet for the hollow fiber type gas separation membrane module for organic vapor separation, for example, the patent document 3 discloses the epoxy resin composition containing a tetraglycidyl compound.

As an adhesive for the hollow fiber for the separation membrane used for the separation of an organic solvent by the pervaporation method, for example, the patent document 4 also discloses a bifunctional or trifunctional epoxy resin composition obtained by the reaction with aminophenols and epihalohydrin.

PATENT DOCUMENTS

Patent document 1: JP-A-S63-267,415
Patent document 2: JP-A-2000-262,838
Patent document 3: JP-A-H02-31,821
Patent document 4: JP-A-H02-218,714

DISCLOSURE OF THE INVENTION

Problems to be Solved by the Invention

Since in the organic vapor separation, the organic vapor mixture obtained by heating a liquid mixture containing organic compounds is supplied to the gas separation membrane module to separate it, the tube sheet is exposed to the organic vapor at a temperature higher than the boiling point of the organic compound. It is, therefore, necessary to prevent the tube sheet from losing its gas-tightness due to the reduction of mechanical strength associated with swelling and crack, and reduction of adhesiveness with the hollow fiber and the like.

In many cases for the gas separation method employing the separation membrane, efficient gas separation is achieved by supplying the gas mixture in a state under high pressure. Since the amount of the permeate-component gas having permeated the gas separation membrane is proportional to the difference of the partial pressures of the permeate-component gases on both sides of the gas separation membrane, supplying the gas mixture having higher pressure enables more efficient gas separation.

Generally, a boiling point of substance rises when ambient pressure increases. It is, therefore, necessary to further elevate the temperature of the organic vapor mixture to be supplied to the gas separation membrane module in order to supply the organic vapor mixture having higher pressure to the gas separation membrane module for the organic vapor separation. That is to say, there has been a problem in a higher risk of losing the gas-tightness of the tube sheet because the tube sheet is exposed to the organic vapor with a higher temperature and higher pressure than ever before if the organic vapor mixture under higher pressure is supplied to the gas separation membrane module.

Furthermore, when an organic vapor mixture is introduced into a separation membrane module under a dry condition, in terms of the tube sheet part, the whole or a part of organic compounds making up the supplied organic vapor mixture begins diffusion into a cured resin composition (hereinafter may be referred to as the tube sheet resin) forming the tube sheet through the hollow fiber membrane. Although a sealed face of the tube sheet comes into direct contact with the organic vapor, the total area of the tube sheet resin contacting the many hollow fiber membranes embedded with the tube sheet is extremely large in comparison with the area of this sealed face. For this reason, the diffusion of the organic compounds into the tube sheet resin occurs mainly through the surface of the hollow fibers and proceeds from the region where the hollow fibers are embedded toward its surrounding area (for example, a side where the tube sheet contacts the housing, in which the hollow fibers are not embedded). At the region in the tube sheet where the organic compounds have intruded via diffusion, the tube sheet resin swells and causes a change in its dimension. Since the penetration of the organic compounds into the tube sheet resin does not proceed uniformly over each site of the tube sheet and proceeds ununiformly from the site where the hollow fibers are embedded, the dimensional change caused by swelling of the tube sheet resin at each site of the tube sheet occurs ununiformly until the entire tube sheet achieves equilibrium, which generates high stress within the tube sheet resin. Since the elongation at break of the resin for the conventional tube sheet resin is close to the modulus of dimensional change by swelling in the resin, when a rapid provision of the organic vapor mixture with an elevated temperature and high pressure and the like into the module causes the extremely ununiform swelling in the tube sheet, there has been a problem in that the resultant distortion may cause destructions such as cracks.

Furthermore, when the separation membrane module is halted after a long period of operation, the tube sheet resin, which achieved an equilibrium swelling ratio with the organic compounds by contacting the organic vapor, is dried by the diffusion of the organic vapor mainly through the surface of the hollow fiber membranes toward the exterior of the tube sheet resin. Since the shrinkage by drying of the swelled tube sheet resin proceeds preferentially from the site where the hollow fibers are embedded, the dimensional change of the tube sheet resin at each site of the tube sheet occurs ununiformly until the entire tube sheet dries, which generates high stress within the tube sheet resin. Since as mentioned earlier, the elongation at break of the tube sheet resin for the tube sheet resin conventionally employed is extremely close to the modulus of dimensional change by its swelling, when a rapid circulation of the dried gas with an elevated temperature and the like through the module causes the shrinkage extremely ununiform in the tube sheet, there has been a problem in that the stress generated in its inside may cause cracks.

Although in order to avoid these problems it is only necessary to employ a highly-ductile substance as the resin composition to form the tube sheet, an increase in ductility of the resin composition is generally associated with a decrease in glass transition temperature of the resin. The substance which has a high glass transition temperature in comparison with a temperature for operation of the module is used as the tube sheet resin in order to prevent the tube sheet from deforming while the tube sheet is exposed to the organic vapor mixture with an elevated temperature and high pressure for a long period. If the glass transition temperature of the tube sheet resin with increased ductibility decreases and approaches a temperature of the module operation, there has been a problem in losing the gas-tightness due to the deformation of the tube sheet when the module operates for a long period.

Means of Solving the Problems

The objective of the present invention is to provide the hollow fiber element for organic vapor separation having the tube sheet with enough endurance to retain gas-tightness of the internal space and external space of the hollow fiber membrane even in use under organic vapor with an elevated temperature and high pressure, and to provide the gas separation membrane module for organic vapor separation.

The present invention relates to a hollow fiber element for organic vapor separation, wherein as a tube sheet, a cured material of an epoxy composition having a glass transition temperature of not less than 160° C., a minimum elongation at break of not less than 7.0% and an elution ratio of less than 5% is employed.

Furthermore, the present invention relates to the aforesaid hollow fiber element for organic vapor separation, wherein the epoxy composition (A) comprises an epoxy compound (a1) represented by the following chemical formula (a1) and/ or an epoxy compound (a2) represented by the following chemical formula (a2), and an epoxy compound (a3) represented by the following chemical formula (a3); and wherein the epoxy compound (a3) in the epoxy composition (A) is in 7 to 50% by weight.

Chemical formula (a1)

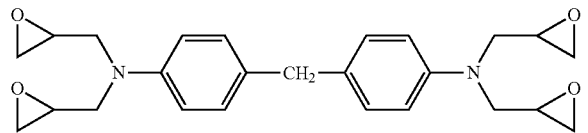

Chemical formula (a2)

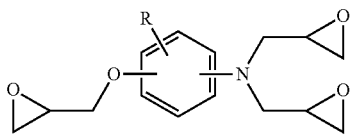

in which R denotes alkyl group having 1 to 3 carbon atoms, fluorinated alkyl group having 1 to 3 carbon atoms or hydrogen atom.

Chemical formula (a3)

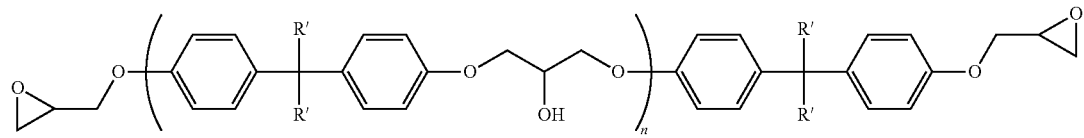

in which R' denotes alkyl group having 1 to 3 carbon atoms, fluorinated alkyl group having 1 to 3 carbon atoms or hydrogen atom, and n denotes an integer of 0 to 20.

Furthermore, the present invention relates to the aforesaid hollow fiber element for organic vapor separation, wherein the epoxy composition (A) comprises an epoxy compound (a2) represented by the following chemical formula (a2), and wherein the hardener (B) is an aromatic amine compound (b1) represented by the following chemical formula (b1).

Chemical formula (a2)

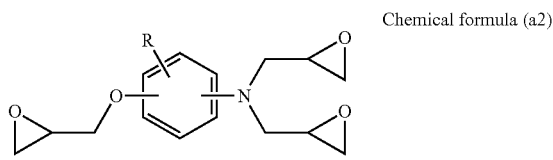

in which R denotes alkyl group having 1 to 3 carbon atoms, fluorinated alkyl group having 1 to 3 carbon atoms or hydrogen atom.

Chemical formula (b1)

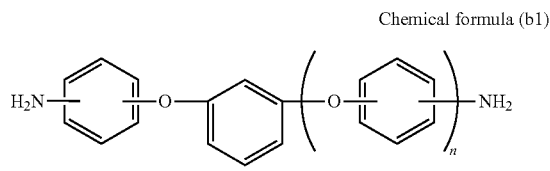

in which n denotes an integer of 0 to 3.

Furthermore, the present invention relates to the aforesaid hollow fiber element for organic vapor separation, wherein the epoxy composition (A) comprises an epoxy compound (a4) represented by the following chemical formula (a4), and wherein the hardener (B) is an aromatic amine compound (b1) represented by the following chemical formula (b1).

Chemical formula (a4)

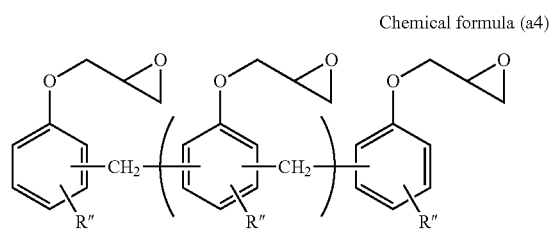

in which R″ denotes alkyl group having 1 to 3 carbon atoms, fluorinated alkyl group having 1 to 3 carbon atoms or hydrogen atom, and n denotes an integer of 0 to 500.

Chemical formula (b1)

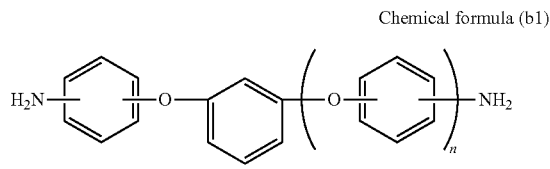

in which n denotes an integer of 0 to 3.

Furthermore, the present invention relates to the aforesaid hollow fiber element for organic vapor separation, wherein the hardener (B) is an aromatic amine compound (b2) represented by the following chemical formula (b2):

Chemical formula (b2)

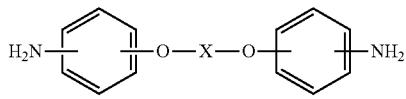

in which X denotes alkylene group having 3 to 5 carbon atoms, or a group represented by the following chemical formula:

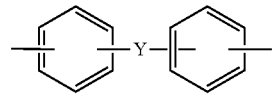

in which Y denotes direct bond, —O—, —CH$_2$—, —SO$_2$—, —C(CH$_3$)$_2$— or —C(CF$_3$)$_2$—.

Furthermore, the present invention relates to the aforesaid hollow fiber element for organic vapor separation, wherein the epoxy composition (A) comprises an epoxy compound (a5) represented by the following chemical formula (a5):

Chemical formula (a5)

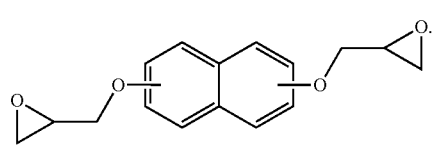

Effect of the Invention

The present invention can provide a hollow fiber element for organic vapor separation which can be suitably used for organic vapor separation and comprises a tube sheet which exerts enough endurance and does not lose its gas-tightness even under an organic vapor atmosphere at an elevated temperature and high pressure, and the gas separation membrane module for organic vapor separation as well.

The use of the gas separation membrane module of the present invention can enable the organic vapor separation with excellent endurance even under a condition at an elevated temperature and high pressure.

BEST MODE FOR CARRYING THE INVENTION

Hereinafter, there will be explained the hollow fiber element for organic vapor separation of the present invention, the method for producing the hollow fiber element, the gas separation membrane module for organic vapor separation housing the hollow fiber element, and the method for separating organic vapor mixture by using the separation membrane module.

Figure 1:
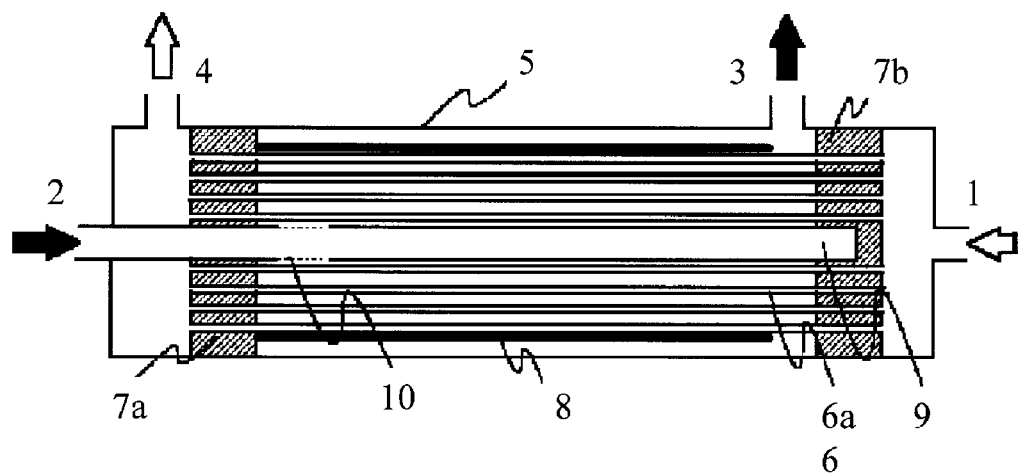
FIG. 1 is a schematic drawing which shows an example of the gas separation membrane module for organic vapor separation.

FIG. 1 is a schematic cross-sectional drawing showing an example of the gas separation membrane module for organic vapor separation of the present invention, wherein the gas separation membrane module has a core tube for supplying carrier gas in an approximately center part of a fiber bundle and has a carrier gas guide film covering a circumferential part of the fiber bundle. In the gas separation membrane module shown in FIG. 1, the outer frame is comprised of cylindrical vessel 5 having mixed gas inlet 1, carrier gas inlet 2, permeate gas outlet 3 and non-permeate gas outlet 4; and in the cylindrical vessel 5 is accommodated the fiber bundle 6 formed by bundling multiple hollow fiber membranes 6a having selective permeability as the hollow fiber element having the following configuration. That is to say, the fiber bundle 6 is each fixed with the second tube sheet 7b consisting of the cured material of the epoxy resin composition at the end part on the side of the permeate gas outlet 3 in the figure, and with the first tube sheet 7a consisting of the cured material of the epoxy composition at the end part on the side of the non-permeate gas outlet 4 in the figure to form the hollow fiber element as a whole. In the hollow fiber element, hollow fiber membranes 6a forming the hollow fiber bundle 6 penetrate the tube sheets 7a and 7b at each side and fixed therewith, while keeping the hollows in open state. In addition, the circumferential part of the hollow fiber bundle 6 is covered with the carrier gas guide film 8 through the positions from where the carrier gas is introduced to where the carrier gas is discharged. In addition, is equipped the core tube 9 that penetrates the tube sheet 7a, which is arranged at the approximately center part of the hollow fiber bundle 6, along the hollow fiber bundle. The connecting hole 10 connecting the internal space of the core tube and the hollow fiber bundle is formed on the core tube at the position near the tube sheet 7a on the side where the carrier gas is introduced.

Next is explained an example of the method for separating the organic vapor mixture using the separation membrane module shown in FIG. 1. The organic vapor mixture is preferably superheated and introduced from the mixed gas inlet 1 into the internal space of the hollow fiber membrane 6a through the aperture of the hollow fiber membrane. While the organic vapor mixture flows through the internal space of the hollow fiber membrane, the permeate vapor containing the higher permeable component selectively permeates and moves to the space where the hollow fiber bundle is housed between the tube sheets 7a and 7b. The non-permeate vapor which has not permeated is discharged from the non-permeate gas outlet 4 through the space which another aperture of the hollow fiber membrane faces. The carrier gas is introduced from the carrier gas inlet 2 of the core tube 9, introduced from the connecting hole 10 of the core tube 9 to the space where the hollow fiber is mounted between the tube sheets 7a and 7b, and flows with contacting the outside of the hollow fiber membranes 6a, and discharged from the permeate gas outlet 3 together with the permeate gas from the hollow fiber membrane. Therefore, the flows of the organic vapor mixture and carrier gas are countercurrent in the module on both sides sandwiching the separation membrane. In addition, the partial pressure of the higher permeable component is controlled such that it is lower on the permeate side than that on the supply side.

Next is explained the hollow fiber element according to the present invention. The hollow fiber element according to the present invention is one in which at least one end part of the hollow fiber bundle consisting of the multiple hollow fiber membranes having at least selective permeability is fixed and bound with the tube sheet formed by the cured material of the epoxy resin composition in a state where the aperture of the hollow fiber is maintained. While an example of the embodiments are as shown in the schematic drawing of FIG. 1 and explained as above, it is not limited only to the example.

The hollow fiber membrane having the selective permeability to be employed for the hollow fiber element of the present invention is formed with a suitable material for separation subject gas and separation condition. It is preferably formed, for example, of a material such as elastomer or glassy polymer, such as polybutadiene, polychloroprene, butyl rubber, silicone resin, polyethylene, polypropylene, ethylene-propylene copolymer, polystyrene, poly-4-methyl-1-pentene, polytetrafluoroethylene, polyvinylidene fluoride, tetrafluoroethylene-ethylene copolymer, polychlorotrifluoroethylene, cellulose acetate, polyvinyl chloride, polyvinyl alcohol, polymethylmethacrylate, polyamide, polysulfone, polyethersulfone, polyether ether ketone, polyimide, polyamide imide, polyetherimide, polyphenylenesulfide, polyarylate, polycarbonate and the like. In the application for separating the organic vapor, the hollow fiber membrane made of aromatic polyimide is most preferred, which is excellent particularly in heat resistance, organic solvent resistance and permeation efficiency.

The structure of the hollow fiber membrane may be homogeneous, or heterogeneous such as a composite membrane and asymmetric membrane. In the application for separating the organic vapor, the asymmetric membrane made of aromatic polyimide is most preferred because it is excellent in selectivity and permeation efficiency. The membrane preferably used has the thickness of 20 to 200 μm and the outside diameter of 50 to 1,000 μm.

The hollow fiber bundle according to the present invention is formed by bundling the multiple hollow fiber membranes having the selective permeability. Usually, a number from 100 to 1,000,000 of the hollow fiber membranes are bundled. There is no particular restriction for the form of the hollow fiber bundle that has been bundled. For example, it may be a hollow fiber bundle in which the hollow fiber membranes have been bundled in the shape of a rectangular column or flat plate, and the tube sheet may be the shape of a rectangular parallelepiped. From the viewpoint of easiness in production and pressure resistance of the vessel, preferably employed is a hollow fiber bundle that is bundled cylindrically and a disc form tube sheet. The hollow fibers may be oriented substantively parallel to an axis or with a certain angle; however, it is preferred to be bundled so as to have alternately-crossed orientation with an angle from 5 to 30 degree to the axial direction.

In terms of the hollow fiber element of the present invention, the tube sheet may fix both end parts of the hollow fiber bundle or only one of the end parts of the hollow fiber bundle. Even in the case where the hollow fiber element is fixed by the tube sheets at both end parts of the hollow fiber bundle, ends of hollow fibers may be choked (i.e. blocked) at one side of ends as long as the hollow fiber is kept open at another side. For the hollow fiber element in which the tube sheet fixes only one of end parts, the hollow fibers are not open at another end part by choking (i.e. blocking) the openings of the hollow fibers at one side, or folding the hollow fiber in U-shape. The hollow fiber bundle are preferably fixed with the tube sheet at both of end parts while the openings of the hollow fiber bundle at both of fiber ends are maintained.

For the cured material of the epoxy composition used for the tube sheet of the hollow fiber element of the present invention, the glass transition temperature is preferably not less than 160° C., more preferably not less than 190° C., particularly preferably not less than 220° C.

When the glass transition temperature is less than 160° C., the rigidity of the tube sheet, which is exposed to the organic vapor mixture with an elevated temperature and high pressure, results in insufficient, which predisposes the tube sheet to deform. As an operation temperature of the module, a temperature not less than 120° C. may be used in order to conduct a more efficient operation of dehydration. It is therefore desired for the tube sheet resin to have the glass transition temperature higher than this temperature, and the resin composition is preferably used, which has the glass transition temperature within the above-described range of temperature. When the glass transition temperature is lower than the above-described range, it is not preferable because the tube sheet makes a plastic deformation while operating the module at an elevated temperature, which the tube sheet is susceptible to lose the gas-tightness. Since an operation of the module at an more elevated temperature and more heightened pressure of the organic vapor supplied to the module enables an ever increased amount of throughput of the organic vapor mixture, the glass transition temperature of the tube sheet resin is preferably not less than 190° C. in terms of preventing the tube sheet from deforming. Since with regard to the tube sheet resin contacting the organic vapor with an elevated temperature and high pressure either directly or via the hollow fibers, the effective glass transition temperature thereof lowers due to plasticization with the organic compounds penetrated and diffused, the glass transition temperature of the tube sheet resin is particularly preferred not less than 220° C.

The glass transition temperature according to the present invention may be estimated by the solid dynamic viscoelastic measurement. The glass transition temperature was given at the peak-top position of tan δ (loss modulus E"/storage modulus E') when a cured material sample of the epoxy composition was measured in the tensile mode (frequency 10 Hz) under a nitrogen atmosphere.

For the cured material of the epoxy composition used for the tube sheet of the hollow fiber element of the present invention, the minimum elongation at break thereof is preferably not less than 7.0%.

The minimum elongation at break according to the present invention indicates the smaller elongation when the elongation at break $\epsilon_b$ of the resin composition in the atmosphere under the standard condition and the elongation at break $\epsilon_{b,S}$ of the resin composition that achieved an equilibrium swelling ratio with the organic compounds are compared. The minimum elongation at break is the maximum elongation with which the most fragile site can endure without destruction in the tube sheet where the organic vapor mixture has intruded ununiformly.

Although the elongation at break varies somewhat depending on the temperature of the resin composition, it may be represented by the actual measured value for the elongation at break at room temperature because its variation due to temperature is not so significant.

At the end of the operation of the module, the organic solvent that has penetrated into the tube sheet is removed by diffusion through the dry air circulating at the site where the hollow fibers are embedded. At this time, the shrinkage rate of the tube sheet resin is not uniform, and a delay of shrinkage happens at the external site where the hollow fibers are not embedded as against the rapid shrinkage at the site where the hollow fibers are embedded. As a result, a significant distortion occurs at the interface between sites with the different rates of shrinkage for the tube sheet resin. If at this time, the minimum elongation at break of the tube sheet resin is small, it is not preferable because the distortion occurring at the interface exceeds the elongation at break of the resin, which increases the possibility of the emergence of cracks.

Although it could be said that the greater minimum elongation at break of the resin composition is the better in terms of preventing the emergence of cracks, for an epoxy resin molded material with a glass transition temperature not less than 160° C. in which a cross linking reaction has sufficiently proceeded, a preferred elongation as the tube sheet resin for the hollow fiber element as long as the minimum elongation at break is not less than 7.0% because the ratio of dimensional change thereof does not exceed ca. 7% after a long period of contact with an organic solvent (ethanol). Here, the ratio of dimensional change intends for the value of dividing the amount of dimensional change that has occurred in a molded material after a long period of contact with an organic solvent by the dimension of the molded material before the contact with the organic solvent.

The elongation at break of the cured material of the epoxy composition can be measured by the tensile test. The elongation at break according to the present invention was given by the nominal strain at break when the tensile test was carried out under the condition that the nominal strain rate is 0.1 min$^{-1}$, which divides the crosshead speed when testing by the initial length (the distance between chucks).

For the cured material of the epoxy composition used for the tube sheet of the hollow fiber element of the present invention, the swelling degree is preferably less than 17%, more preferably less than 16%.

The swelling degree according to the present invention intends for the ratio of weight increase in the state where the equilibrium swelling has been achieved with the organic compounds. In terms of the swelling degree of the present invention, the ratio of weight increase is used in which ethanol at 130° C. has been selected as the organic compound at an elevated temperature.

The swelling degree is an amount which also relies on the extent of progress of the cross linking reaction in the cured material. The swelling degree according to the present invention is the swelling degree for the cured material when the stoichiometric amounts are in equal amount which are calculated from the epoxy equivalent of the epoxy composition and the active hydrogen equivalent of the aromatic amine compounds, and the cross linking reaction has sufficiently proceeded by sufficient heating.

If the swelling degree is not less than 17%, it is not preferable due to tremendous deformation of the tube sheet when contacting with the organic compounds.

For the cured material of the epoxy composition used for the tube sheet of the hollow fiber element of the present invention, the maximum stress ($\sigma_{max,\,S}$) is preferably not less than 40 MPa, more preferably not less than 45 MPa, more preferably not less than 50 MPa, further preferably not less than 55 MPa in the state where the equilibrium swelling ratio has been achieved with the organic compounds.

At the onset of the operation of the module, the organic compounds making up the organic vapor permeates the dry tube sheet resin by diffusion through the site where the hollow fibers are embedded. At this time the swelling degree of the tube sheet resin does not become uniform, and the swelling degree becomes relatively higher at the site where the hollow fibers are embedded relative to the external site where the hollow fibers are not embedded, which causes significant stress in the proximity of the interface between sites with the different swelling degree in the tube sheet resin. If at this time the maximum stress of the tube sheet resin is small, it is not preferable because the tube sheet resin itself cannot endure the stress caused in its interior, which increases the possibility of the emergence of cracks.

When the ununiform swelling inside the tube sheet over a period after the onset of the operation of the module causes cracks on the tube sheet, it is contemplated that the diffusion of organic compounds somewhat has already reached the position of the origin of the cracks. While the organic compounds are diffused, the tube sheet resin is plasticized and the maximum stress thereof is reduced. When the tube sheet resin has achieved an equilibrium swelling ratio and the maximum stress has shown the largest descent, if the maximum stress is low, the aforesaid range is preferable because the cracks are predisposed to occur in the tube sheet. Furthermore, the aforesaid range is also preferable in an attempt to prevent the tube sheet part from causing a breakage owing to an external force being applied while handling the module.

The maximum stress can be estimated by the tensile test. The tensile test was carried out under the condition that the nominal strain rate is 0.1 min$^{-1}$, which divides the crosshead speed while testing by the initial length (the distance between chucks), and then the maximum stress according to the present invention was given by the value of dividing the maximum load by the cross sectional area of a sample before testing (the maximum value of the nominal stress).

For the cured material of the epoxy composition used for the tube sheet of the hollow fiber element of the present invention, the Young's modulus ($E_S$) is preferably not less than 1.6 GPa, more preferably not less than 1.7 GPa, further preferably not less than 1.8 GPa in the state where the equilibrium swelling ratio has been achieved with the organic compounds.

An outward stress is generated in the tube sheet resin if the tube sheet resin expands with heat or swells with the organic compounds during the operation of the module. In this regard, since the tube sheet cannot deform outward at the site where the housing secured, the deformation exclusively causes toward the direction where the housing is not fixated. If in particular, the state persists for prolonged periods in which the organic compound has penetrated and the stress has been generated inside the tube sheet resin, the resin causes creep deformation toward the direction where the housing is not fixated, which may eventually cause degradation of the gas-tightness of the module and the emergence of cracks. If at this time the Young's modulus of the tube sheet resin is small, it is not preferable because the amount of the resin's deformation becomes large, which may lead to degradation of the endurance of the tube sheet.

The Young's modulus can be estimated by the tensile test. The tensile test was carried out under the condition that the nominal strain rate is 0.1 min$^{-1}$, which divides the crosshead speed while testing by the initial length (the distance between chucks), and then the Young's modulus according to the present invention was given by the initial gradient of the nominal stress-nominal strain curve.

When $\epsilon_{b,S}$, $\sigma_{max,S}$, $E_S$ are evaluated, whereas the sample that has achieved the equilibrium swelling ratio with exposure to the organic vapor under a condition of the actual operation of the module may be tested and measured in that atmosphere, the measurement may be carried out for the sample that has been immersed in the organic compound at an elevated temperature to achieve the equilibrium swelling ratio. The latter is preferably used because it turns out an evaluation in a setting with higher risk. As the organic compound to be used to evaluate $\epsilon_{b,S}$, $\sigma_{max,S}$, $E_S$, alcohol, in particular ethanol is preferably used. Since the diffusion rate of ethanol is low within the cured material of the epoxy composition, and drying does not proceed immediately even when the sample that has been immersed in ethanol at an elevated temperature to achieve the equilibrium swelling ratio is cooled down to room temperature and brought out into the atmosphere, the mechanical test can be readily carried out to measure the elongation at break, the maximum stress and the Young's modulus.

In order for the cured material to achieve the equilibrium swelling ratio with ethanol, when a sample is used with a thickness of, for example, about 100 μm, it is enough to be immersed in ethanol at 130° C. for 120 hours in a closed vessel.

For the cured material of the epoxy composition used for the tube sheet of the hollow fiber element of the present invention, the elution ratio is preferably less than 5%, more preferably less than 4.5%, further more preferably less than 4.0%.

The elution ratio intends for the ratio of weight loss when a resin composition is immersed in an organic compound at an elevated temperature. In the present invention, as the elution ratio, the ratio of weight loss is used when ethanol at 130° C. is selected as the organic compound at an elevated temperature.

The elution ratio of the present invention can be obtained by immersing the sample which has a thickness of about 100 μm and a length and a width being sufficiently larger than the thickness (for example, a sample with a length and a width not less than 5 mm) within ethanol at 130° C. for 120 hours in a closed vessel, and calculated by multiplying 100 by the value in which the change of dry weight (the weight loss) before and after the immersion is divided by weight of the sample before the immersion within ethanol.

If the elution ratio is not less than 5%, it is not preferable because a possibility that substances eluted from the tube sheet resin contaminate the separated organic compound is heightened, which degrades the quality of product.

In the Aspect I of the present invention, the epoxy composition (A) to be used for the tube sheet of the hollow fiber element comprises the epoxy compound (a1) represented by the aforesaid chemical formula (a1) and/or the epoxy compound (a2) represented by the aforesaid chemical formula (a2), and the epoxy compound (a3) represented by the aforesaid chemical formula (a3), and the epoxy composition (A) preferably comprises these epoxy compounds at an amount not less than 80% by weight, more preferably not less than 90% by weight. It is also preferred that 100% by weight of the epoxy composition (A) consists of only these epoxy compounds. The epoxy compounds that can be used in combination with the epoxy composition (A) are those explained in other aspects of the present invention.

The amount of the epoxy compound (a3) that the epoxy composition (A) contains in a total of 100 parts by weight is preferably not less than 7 parts by weight, more preferably not less than 9 parts by weight, further preferably not less than 10 parts by weight, and also preferably not more than 50 parts by weight, more preferably not more than 45 parts by weight, further preferably not more than 40 parts by weight, particularly preferably not more than 30 parts by weight.

If the epoxy compound (a3) in the 100 parts by weight of the epoxy composition is in not more than 7 parts by weight, it is not preferable because the minimum elongation at break of the cured material in which the epoxy composition has been cured becomes less than 7.0%, which increases the probability of the emergence of cracks in use as the tube sheet material.

If the epoxy compound (a3) in the 100 parts by weight of the epoxy composition is in not less than 50 parts by weight, it is not preferable because the elution ratio of the cured material in which the epoxy composition has been cured becomes not less than 5.0%, which heightens the possibility that substances eluted from the tube sheet resin contaminate the separated organic compound.

The epoxy compound (a1) represented by the chemical formula (1) includes jER 604 made by Japan Epoxy Resins Co., Ltd., EPICLON 430 made by DIC Corporation, EPOTOHTO YH-434 made by Tohto Kasei Co., Ltd., ARALDITE MY-720, ARALDITE MY-721 made by Huntsman Advanced Materials LLC and the like.

Specific examples of the epoxy compound (a2) represented by the chemical formula (a2) include triglycidyl derivatives such as 4-amino-phenol, 4-amino-m-cresol, 4-amino-o-cresol, 2-ethyl-4-aminophenol and, 3-ethyl-4-aminophenol. Among them, triglycidyl-4-aminophenol is particularly preferable.

Triglycidyl-4-aminophenol includes jER 630 made by Japan Epoxy Resins Co., Ltd., ARALDITE MY0500, ARALDITE MY0510 made by Huntsman Advanced Materials LLC and the like.

In the chemical formula (a3), R' is preferably hydrogen atom, methyl group or trifluoromethyl group. The epoxy compound (a3) represented by the chemical formula (a3) includes jER806, jER827, jER828, jER1001 made by Japan Epoxy Resins Co., Ltd., EPICLON830, EPICLON840, EPICLON850 made by DIC Corporation, EPOTOHTO YH-128 made by Tohto Kasei Co., Ltd., ADEKA RESIN EP-4100, ADEKA RESIN EP-4901 made by ADEKA Corporation and the like.

Although the hardener (B) is not particularly limited, the amine-based hardeners are preferably utilized as a hardener which readily allows for significant resistance to water and excellent mechanical properties. As the amine-based hardener may be employed aromatic amine compounds, aliphatic amine compounds, alicyclic amine compounds and a combination thereof. Aromatic amine compounds are particularly preferable because they readily allow for rising the temperature of glass-transition in the cured material.

The examples of aromatic amine compounds include monocyclic aromatic diamine such as 2,4-diaminotoluene, p-phenylenediamine, m-phenylenediamine and alkyl 3,5-diamino-4-chlorobenzoate ester; diaminodiphenylmethanes such as 4,4'-diaminodiphenylmethane, 3,3'-dichloro-4,4'-diaminodiphenylmethane, 3,3'-dimethyl-4,4'-diaminodiphenylmethane and 3,3'-diethyl-4,4'-diaminodiphenylmethane; diaminodiphenyl sulfones such as 4,4'-diaminodiphenyl sulfone, 3,3'-dichloro-4,4'-diaminodiphenyl sulfone, 3,3'-dimethyl-4,4'-diaminodiphenyl sulfone and 3,3'-diethyl-4,4'-diaminodiphenyl sulfone; diaminodiphenyl ethers such as 4,4'-diaminodiphenyl ether, 3,3'-dichloro-4,4'-diaminodiphenyl ether, 3,3'-dimethyl-4,4'-diaminodiphenyl ether and 3,3'-diethyl-4,4'-diaminodiphenyl ether, and the modified aromatic amine compounds in which these are modified may also be used. These aromatic amine compounds may be used by a single compound or as a mixture of two or more compounds. Among them, Diaminodiphenylmethanes or diaminodiphenyl ethers is preferable, and 4,4'-diaminodiphenylmethane or 3,4'-diaminodiphenyl ether is particularly preferable.

4,4'-Diaminodiphenylmethane includes MDA-200 made by Mitsui Chemical Polyurethane, Inc. and the like.

The use ratio of the aromatic amine compound as the hardener (B) is preferably about 60 percent to 140 percent to the stoichiometric amount calculated from the epoxy equivalent of the epoxy composition and the active hydrogen equivalent of the aromatic amine compound. Furthermore, the blending is preferably made so that the ratio is 80 percent to 120 percent of the stoichiometric amount. Case out of these ranges is not preferable because the curing of the epoxy composition results in insufficient and the solid tube sheet is not formed.

In the Aspect II of the present invention, the tube sheet of the hollow fiber element may be obtained by curing the epoxy composition (A) comprising the epoxy compound (a2) represented by the aforesaid chemical formula (a2) by using the aromatic amine compound (b1) represented by the aforesaid chemical formula (b1).

The epoxy compound (a2) represented by the chemical formula (a2), as explained in the Aspect I described in the foregoing, includes specifically jER 630 made by Japan Epoxy Resins Co., Ltd., ARALDITE MY0500, ARALDITE MY0510 made by Huntsman Advanced Materials LLC and the like.

The epoxy composition (A) may be used in combination with other epoxy compounds than the epoxy compound (a2) represented by the aforesaid chemical formula (a2). In particular, multifunctional epoxy compounds are preferably used in combination because the cured material can be obtained which has a relatively high glass transition temperature.

The multifunctional epoxy compound includes the epoxy compound (a1) having the tetraglycidyl structure represented by the aforesaid chemical formula (a1), the epoxy compound (a4) having the phenol novolac structure represented by the aforesaid chemical formula (a4) and a mixture thereof. Among them, the epoxy compound (a1) is particularly preferable. The epoxy compound (a1) is as explained in the Aspect I described in the foregoing, and the epoxy compound (a4) will be described later in the Aspect III.

In the epoxy composition (A), the content of the epoxy compound (a2) represented by the chemical formula (a2) is preferably not less than 10% by weight, particularly preferably not less than 20% by weight.

The aromatic amine compound (b1) represented by the chemical formula (b1) includes:
3,3'-diaminodiphenyl ether, 3,4'-diaminodiphenyl ether, in which n=0,
1,3-bis(3-aminophenoxy)benzene, 1,3-bis(4-aminophenoxy)benzene, in which n=1,
4-[3-[4-(4-aminophenoxy)phenoxy]phenoxy]benzene amine, in which n=2, and the like. Among them, 3,4'-diaminodiphenyl ether and 1,3-bis(4-aminophenoxy)benzene are particularly preferable.

The use ratio of the aromatic amine compound (B) is preferably about 60 percent to 140 percent to the stoichiometric amount calculated from the epoxy equivalent of the epoxy composition and the active hydrogen equivalent of the aromatic amine compound. Furthermore, the blending is preferably made so that the ratio is 80 percent to 120 percent of the stoichiometric amount. Case out of these ranges is not preferable because the curing of the epoxy composition results in insufficient and the solid tube sheet is not formed.

In the Aspect III of the present invention, the tube sheet of the hollow fiber element may be obtained by curing the epoxy composition (A) comprising the epoxy compound (a4) represented by the aforesaid chemical formula (a4) by using the aromatic amine compound (b1) represented by the aforesaid chemical formula (b1).

In the chemical formula (a4), R" is preferably methyl group or hydrogen atom. The epoxy compound (a4) represented by the chemical formula (a4) includes jER152, jER154 made by Japan Epoxy Resins Co., Ltd., EPICLONN740, EPI- CLONN770, EPICLONN775 made by DIC Corporation, YDPN-638, YDCN-700 series made by Tohto Kasei Co., Ltd. and the like.

The epoxy composition (A) may be used in combination with other epoxy compounds than the epoxy compound (a4) represented by the aforesaid chemical formula (a4). In particular, multifunctional epoxy compounds are preferably used in combination because the cured material can be obtained which has a relatively high glass transition temperature.

The multifunctional epoxy compound, which is not particularly limited, includes, for example, the epoxy compound (a1) having the tetraglycidyl structure represented by the chemical formula (a1), the epoxy compound (a2) having the triglycidylphenol structure represented by the chemical formula (a2) and a mixture thereof. The epoxy compound (a1) and the epoxy compound (a2) are as explained in the Aspect I described in the foregoing.

In the epoxy composition (A), the content of the epoxy compound (a4) represented by the chemical formula (a4) is preferably not less than 10% by weight, particularly preferably not less than 20% by weight.

The aromatic amine compound (b1) represented by the chemical formula (b1) includes
3,3'-diaminodiphenyl ether, 3,4'-diaminodiphenyl ether, in which n=0,
1,3-bis(3-aminophenoxy)benzene, 1,3-bis(4-aminophenoxy)benzene, in which n=1,
4-[3-[4-(4-aminophenoxy)phenoxy]phenoxy]benzene amine, in which n=2, and the like.

Among them, 3,4'-diaminodiphenyl ether and 1,3-bis(4-aminophenoxy)benzene are preferable.

The use ratio of the aromatic amine compound (b1) is preferably about 60 percent to 140 to the stoichiometric amount calculated from the epoxy equivalent of the epoxy composition and the active hydrogen equivalent of the aromatic amine compound. Furthermore, the blending is preferably made so that the ratio is 80 percent to 120 percent of the stoichiometric amount. Case out of these ranges is not preferable because the curing of the epoxy composition results in insufficient and the solid tube sheet is not formed.

In the Aspect IV of the present invention, the tube sheet of the hollow fiber element may be obtained by curing the epoxy composition (A) by using the aromatic amine compound (b2) represented by the aforesaid chemical formula (b2).

The aromatic amine compound (b2) represented by the aforesaid chemical formula (b2) includes 2,2-bis(4-aminophenoxy(4-phenyl))propane, 2,2-bis(4-aminophenoxy(4-phenyl))hexafluoropropane, 4,4'-bis(4-aminophenoxy)biphenyl, bis[4-(4-aminophenoxy)phenyl]sulfone, bis[4-(3-aminophenoxy)phenyl]sulfone, 1,3-bis(4-aminophenoxy)propane, 1,4-bis(4-aminophenoxy)butane, 1,5-bis(4-aminophenoxy)pentane and the like.

Among them, 2,2-bis(4-aminophenoxy(4-phenyl))propane, 4,4'-bis(4-aminophenoxy)biphenyl or bis[4-(4-aminophenoxy)phenyl]sulfone is particularly preferable.

In order to obtain the cured material having a relatively high glass transition temperature, the epoxy composition (A) is preferably a multifunctional epoxy compound with three or more functionalities. Specifically, it includes the epoxy compound (a1) having the tetraglycidylamine structure represented by the chemical formula (a1), the epoxy compound (a2) having the triglycidylphenol structure represented by the chemical formula (a2), the epoxy compound (a4) having the phenol novolac structure represented by the chemical formula (a4) and a mixture thereof. The epoxy compound (a1) and the epoxy compound (a2) are as explained in the Aspect I described in the foregoing, and the epoxy compound (a4) is as explained in the Aspect III.

Among them, the epoxy compound (a1) having the tetraglycidylamine structure, the epoxy compound (a2) having the triglycidylphenol structure represented by the chemical formula (a2) and a mixture thereof, which give the cured material having a particularly high glass transition temperature are particularly preferable.

The use ratio of the aromatic amine compound (b2) is preferably about 60 percent to 140 percent to the stoichiometric amount calculated from the epoxy equivalent of the epoxy composition and the active hydrogen equivalent of the aromatic amine compound. Furthermore, the blending is preferably made so that the ratio is 80 percent to 120 percent of the stoichiometric amount. Case out of these ranges is not preferable because the curing of the epoxy composition results in insufficient and the solid tube sheet is not formed.

In the Aspect V of the present invention, the epoxy composition to be used for the tube sheet of the hollow fiber element is the composition comprising the epoxy compound (a5) represented by the aforesaid chemical formula (a5).

The epoxy compound (a5) represented by the aforesaid chemical formula (a5) includes EPICLON HP-4032D made by DIC Corporation and the like.

The epoxy composition (A) may be used in combination with other epoxy compounds than the epoxy compound (a5) represented by the aforesaid chemical formula (a5). In particular, multifunctional epoxy compounds are preferably used in combination because the cured material can be obtained which has a relatively high glass transition temperature.

The multifunctional epoxy compound, which is not particularly limited, includes, for example, the epoxy compound (a1) having the tetraglycidylamine structure represented by the chemical formula (a1), the epoxy compound (a2) having the triglycidylphenol structure represented by the chemical formula (a2), the epoxy compound (a4) having the phenol novolac structure represented by the chemical formula (a4) and a mixture thereof. Among them, the epoxy compound (a1), the epoxy compound (a2) and a mixture thereof are particularly preferable. The epoxy compound (a1) and the epoxy compound (a2) are as explained in the Aspect I described in the foregoing, and the epoxy compound (a4) is as explained in the Aspect III.

In the epoxy composition (A), the content of the epoxy compound (a5) represented by the chemical formula (a5) is preferably not less than 10% by weight, particularly preferably not less than 20% by weight.

Although the hardener (B) is not particularly limited, the amine-based hardeners are preferably utilized as a hardener which readily allows for significant resistance to water and excellent mechanical properties. As the amine-based hardener, aromatic amine compounds, aliphatic amine compounds, alicyclic amine compounds and a combination thereof may be employed. Aromatic amine compounds are particularly preferable because they readily allow for rising the glass-transition temperature in the cured material.

The aromatic amine compounds include monocyclic aromatic diamine such as 2,4-diaminotoluene, p-phenylenediamine, m-phenylenediamine and alkyl 3,5-diamino-4-chlorobenzoate ester; diaminodiphenylmethanes such as 4,4'-diaminodiphenylmethane, 3,3'-dichloro-4,4'-diaminodiphenylmethane, 3,3'-dimethyl-4,4'-diaminodiphenylmethane and 3,3'-diethyl-4,4'-diaminodiphenylmethane; diaminodiphenyl sulfones such as 4,4'-diaminodiphenyl sulfone, 3,3'-dichloro-4,4'-diaminodiphenyl sulfone, 3,3'-dimethyl-4,4'-diaminodiphenyl sulfone and 3,3'-diethyl-4,4'-diaminodiphenyl sulfone; 4,4'-diaminodiphenyl ether, 3,3'-dichloro-4,4'-diaminodiphenyl ether, 3,3'-dimethyl-4,4'-diaminodiphenyl ether and 3,3'-diethyl-4,4'-diaminodiphenyl ether, and the modified aromatic amine compounds in which these are modified may also be used. These aromatic amine compounds may be used by a single compound or as a mixture of two or more compounds. Among them, diaminodiphenylmethanes or diaminodiphenyl ethers are preferable, and 4,4'-diaminodiphenylmethane or 3,4'-diaminodiphenyl ether is particularly preferable.

The use ratio of the aromatic amine compound as the hardener (B) is preferably about 60 percent to 140 percent to the stoichiometric amount calculated from the epoxy equivalent of the epoxy composition and the active hydrogen equivalent of the aromatic amine compound. Furthermore, the blending is preferably made so that the ratio is 80 percent to 120 percent of the stoichiometric amount. Case out of these ranges is not preferable because the curing of the epoxy composition results in insufficient and the solid tube sheet is not formed.

The cured material in which the epoxy composition to be used for the tube sheet of the hollow fiber element of the present invention has been cured by using the hardener can be obtained by subjecting to heat treatment the uncured resin (hereinafter may be referred to as the casting resin composition) in which the epoxy composition and the hardener have been mixed.

For the condition of the heat treatment, the cured material of the casting resin composition can be obtained by, for example, the first curing of the uncured resin by heating at a temperature of 60° C. for 15 hours, being followed by rising temperature up to 110° C. at a rate of temperature rise of 0.25° C./min. and heating for 3 hours while keeping the temperature at 110° C., and then the post curing of the first-cured resin by heating at 110° C. for further 2 hours, being followed by rising temperature up to 180° C. at a rate of temperature rise of 0.25° C./min. and heating for 4 hours while keeping the temperature at 180° C. Although the cured material with good properties can be obtained by various conditions of the heat treatment, if the uncured resin is heated directly up to 110° C. or higher at a rate of temperature of faster than 0.1° C./min., it is not preferable because a possibility that thermal runaway occurs by the heat of reaction generated rapidly within the casting resin composition is heightened.

It is desired that the first curing proceeds to the extent that the casting resin composition loses its fluidity at 110° C. or lower to obtain the cured material of the casting resin composition with good properties. As the way of the first curing, the casting resin composition may be heated up very slowly at a rate not more than 0.1° C./min., or the casting resin composition may be kept with heat at an appropriate constant temperature for a prolonged period. To prevent physical properties change while operating the module, it is desired that the casting resin composition is subjected to the final heat treatment at a temperature not less than the operation temperature of the module, for example, not less than 120° C., more preferably not less than 160° C.

It is preferred that the hollow fiber element of the present invention has the core tube having the function to introduce gas into the approximately center part of the hollow fiber bundle. The gas to be introduced into near the center part of the hollow fiber bundle is preferably carrier gas. Since the object thereof is to diffuse the introduced gas throughout the entire hollow fiber bundle, the approximately center part of the hollow fiber bundle as referred herein may be a certain level so as to achieve the object and is by no means limited to precise center.

The material used for forming the core tube is not particularly limited as long as the core tube has predetermined gas-tightness and pressure resistance and it is preferably formed of metal, plastic, or ceramics and the like. While the distal end of the core tube is closed and buried in the second tube sheet 7b in the case shown in the FIG. 1, the anchoring to the tube sheet may not be necessary, and the presence of a gap at a level that can absorb displacement by thermal expansion and the like is preferred.

In the hollow fiber element of the present invention, it is preferred that the carrier gas guide film is disposed on the circumferential part of the hollow fiber bundle in advance.

The material of the carrier gas guide film is not particularly limited; however, it may be formed of any material as long as the material does not substantially allow or does scarcely allow to permeate the mixed gas supplied into the device. The examples preferably used are plastic film such as polyethylene, polypropylene, polyamide, polyester, polyimide or metallic foil of aluminum or stainless-steel. Particular preference is given to polyimide film in view of heat resistance, solvent resistance and processability. In addition, while the thickness of the carrier gas guide film 8 is not particularly limited, its preferred range may be from several tens of micrometers to 2 mm because too thick film may occupy the space where the hollow fibers are disposed and reduce effective membrane area.

The carrier gas guide film is preferably disposed such that it is fixed or separated with a small gap on the first tube sheet 7a, which is on the side near to the connecting hole of core tube, and it is spaced from the second tube sheet 7b, because this configuration allows the carrier gas to flow in a direction opposite to the organic vapor mixture and enhances the separation efficiency.

Next, the method for producing the hollow fiber element of the present invention will be explained.

Firstly, the method for bundling the hollow fiber membranes to form the hollow fiber bundle will be explained.

The method for bundling the hollow fiber membranes so as to have alternately-crossed orientation with an angle from 5 to 30 degree to the axial direction is, for example, the following method. 1 to 100 of the hollow fiber membranes are distributed on a core tube by means of a fiber distribution guide that reciprocates at a constant rate in the axial direction of the tubular material to be a core (core tube), and at the same time the core tube rotates at a constant rate. Consequently, the hollow fiber membranes are not arranged parallel to the axis, but distributed with an angle in accordance with the rotation of the core tube against the axial direction. Once the fiber under distribution reaches one of the ends, the hollow fiber membranes are fixed on the site and the fiber distribution guide retraces in the opposite direction to carry out the further distribution of the fiber. Since the core tube continues to rotate in the same direction, the fiber distribution is in turn performed with the same angle to the previous one just in the opposite direction against the axial direction. By repeating this step, the hollow fiber membranes are distributed alternately crosswise on the hollow fiber membranes having been distributed with the opposite angle to be bundled into the hollow fiber bundle.

Figure 2:
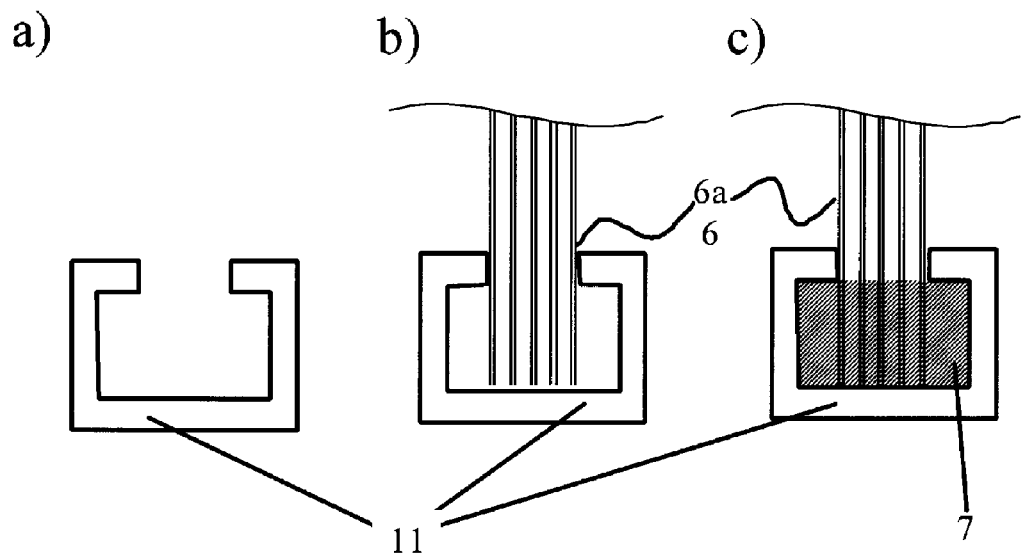
FIG. 2 is a schematic drawing which shows a method for making a hollow fiber element for organic vapor separation according to the present invention.

Next, there will be explained the method for forming the tube sheet according to the present invention as follows. The hollow fiber bundle 6 is formed by the method mentioned above by bundling a predetermined number of the hollow fiber membranes with predetermined length. After removing the core tube or retaining the core tube in the approximately center part of the fiber bundle, the hollow fiber bundle is installed at a predetermined position in the mold 11 which forms the tube sheet at the end part, and the hollow fiber bundle and the cylindrical vessel are held substantially vertically with the end part downwards. An illustrative drawing of this situation is shown in FIG. 2b.

A predetermined amount of the casting resin composition consisting of the epoxy resin composition and the hardener is cast into the mold 11 for forming the tube sheet. An illustrative drawing of the state where the casting resin composition has been cast is shown in FIG. 2c. The method for molding the casting resin composition is not particularly limited; however, preference is given to the casting from a plurality of positions on the downside of a vessel by a syringe because of easiness in uniform cast into the tube sheet. If the casting rate of the casting resin composition is too high, uniform casting of the casting resin composition into the sites to be filled is difficult, and therefore, preferably, sufficient time should be taken for the casting. It is preferred to suitably control the temperature of the mold during the casting of the casting resin composition into the mold. It is also preferred to control the temperature of the casting resin composition.

It is preferred that the casting resin composition before curing is in liquid form at a temperature when the resin is cast for its moldability.

Although there is no particular limitation on the viscosity of the casting resin composition, the viscosity is preferably not less than 10 poises and less than 120 poises, particularly preferably not less than 20 poises and less than 110 poises at a temperature of 40° C., normally used while casting the resin. Here, the viscosity of the resin composition is preferably measured by using a rotational viscometer.

If the viscosity of the casting resin composition at 40° C. is not less than 120 poises, there are problems in that a prolonged time is required to cast the resin while molding the tube sheet, and as well it becomes difficult to remove bubbles generated while casting the resin, and furthermore voids form due to insufficient permeation of the resin between hollow fiber membranes.

If the viscosity of the casting resin composition at 40° C. is less than 10 poises, it is not preferable because of a strong tendency in that a large shrinkage occurs when the casting resin composition has been cured, leading to a defect in molding.

After casting the casting resin composition into the mold 11, the casting resin composition is cured by maintaining the mold and the hollow fiber bundle at a constant temperature to form the tube sheet. At this time, the temperature is preferably not more than 100° C., more preferably at 30 to 80° C. If the temperature is high at this step, it is not preferable because the curing reaction of the casting resin composition becomes intense, which adversely affects the strength of the tube sheet finally obtained.

It is preferred to conduct post-curing by heating the casting resin composition after curing the casting resin composition in regard to improvement of the durability and mechanical properties of the tube sheet. The temperature of 100° C. to 250° C. for post-curing is preferred. It is not preferred that the temperature upon post-curing is lower than 100° C. because the casting resin composition would be cured insufficiently. In addition, it is not preferred that the temperature upon post-curing is too high because it leads to vigorous reaction in the curing of the casting resin composition, which adversely affect the strength of the tube sheet. When the casting resin composition is post-cured, it may be divided to several stages and may be heated at different temperature at each stage.

After post-curing the casting resin composition, the tube sheet is cut to open the hollow fiber membrane at its end part. Thus, formed is the hollow fiber element fixed with the tube sheet while retaining the hollow fibers in an opened state at its end part.

If the tube sheets are to be formed at both the end parts of the hollow fiber bundle, after forming the tube sheet at one of the end parts of the hollow fiber bundle by the above-mentioned procedure, the tube sheet is formed at another end part by a similar procedure. The term "after forming the tube sheet at one of the end parts" may be even after cutting the tube sheet to open the hollow fiber membranes at its end part. It is also preferred that after setting one end part in the mold and casting the casting resin composition and curing it but before post-curing, another tube sheet at another end part is formed so as to conduct the post-curing and subsequent procedure thereafter simultaneously at both of the end parts.

The carrier gas guide film 8 formed on the circumferential part of the hollow fiber bundle 6 may also be produced as follows. First, the hollow fiber bundle having bundled hollow fiber membranes is produced by the above-mentioned method or the like. A polyester film, for example, is wrapped around and its overlapping part is glued to form the carrier gas guide film 8 on the circumference of the bundle. Then, keeping the film being wrapped around, tube sheets are formed at both the end parts of the bundled. In doing so, the film end is also fixed together at the end part corresponding to the tube sheet 7a on the side of the carrier gas inlet, and another end of the film is not fixed to the tube sheet 7b at the end part corresponding to the tube sheet 7b on the side of the carrier gas outlet so as to ensure gap that allows the permeate gas and carrier gas to flow out from the hollow fiber bundle to the permeate gas outlet. In addition, at the circumference of the hollow fiber bundle may be equipped with an inner case consisting of mesh or two of half-cases to protect the hollow fiber element so that a flow path for the organic vapor mixture is ensured.

The gas separation membrane module for organic vapor separation according to the present invention is composed by accommodating (housing) one or two or more of the above-mentioned hollow fiber element(s) for organic vapor separation in a vessel having at least a mixed gas inlet, a permeate gas outlet and a non-permeate gas outlet. The embodiment of the gas separation membrane module is not particularly limited and it may be a bore feed-type or shell feed-type, or a type employing carrier gas or type employing no carrier gas. For the type employing the carrier gas, it is preferred to dispose the carrier gas inlet on the vessel, or to dispose the carrier gas inlet within the hollow fiber element.

For the gas separation membrane module of the present invention, it is preferred that the hollow fiber element is detachable.

The gas separation membrane module having the hollow fiber element within the vessel is partitioned by the tube sheet and sealed except a flow path of vapor to form a space having gas-tightness. The sealing method is not particularly limited; however, elastic O-rings and gaskets are preferably employed.

The gas separation membrane module for organic vapor separation of the present invention may take various embodiments depending on the forms of the housed hollow fiber element and the arrangements of the mixed gas inlet, permeate gas outlet, non-permeate gas outlet and the like. For example, it may be either cylindrical or box-shaped. In any case, the space leading to the internal space of the hollow fiber membrane and the space leading to the external space of the hollow fiber membrane are separated one another to retain the gas-tightness in the module.

Since the vessel of the gas separation membrane module is subjected to fluid at an elevated temperature and fluid under high pressure or a condition under reduced pressure when the separation of organic vapor is carried out, sufficient strength and stability under use conditions are necessary for the vessel. Its material is not particularly limited; however, metal, plastic, glass fiber composite material and ceramics are preferably used.

It is preferred that the gas separation membrane module for organic vapor separation of the present invention is composed such that the mixed gas inlet and non-permeate gas outlet lead to the internal space of the hollow fiber membrane, and the carrier gas inlet and permeate gas outlet lead to the external space of the hollow fiber membrane. In particular, it is preferred that the carrier gas inlet is arranged to the core tube placed in the approximately center part of the hollow fiber element.

The method for separating the organic vapor mixture by using the gas separation membrane module for organic vapor separation of the present invention will be explained.

In the gas separation with the separation membrane, two spaces that sandwich the separation membrane are divided into the space (primary side) into which the feedstock gas is supplied and the space (secondary side) into which the permeate gas permeates to be given.

In the method for separating the organic vapor mixture using the gas separation membrane module for organic vapor separation of the present invention, it may be either the bore feed where the internal space of the hollow fiber membrane is the primary side (the side for supplying the feedstock gas) or the shell feed where, in contrast, the external space of the hollow fiber membrane is the primary side. In order to effectively utilize the hollow fiber membrane, preference is given to the bore feed where the feedstock gas less likely drifts.

In both cases of the shell feed and bore feed, the method for separating the organic vapor mixture by means of the gas separation membrane module is carried out by the method described below. That is to say, the organic vapor mixture supplied from the mixed gas inlet into the space on the primary side in the gas separation membrane module flows with contacting the surface of the hollow fiber membranes and it is discharged outside module from the non-permeate gas outlet. In the meanwhile, the permeate gas that has permeated the hollow fiber membranes is discharged outside module from the permeate gas outlet placed in the secondary side space. Since the hollow fiber membranes have the selective permeability, the permeate gas that has permeated the membranes is rich in the high permeable component and the non-permeate gas discharged from the non-permeate gas outlet has the reduced concentration of the high permeable component.

In the method for separating the organic vapor mixture by the gas separation membrane module for organic vapor separation of the present invention, its operations are carried out such that the partial pressure of the high permeable component on the primary side is higher than the partial pressure of the high permeable component on the secondary side.

Specific example is the method of holding the secondary side of the membranes under reduced pressure to ensure the partial pressure difference of the high permeable component between the both sides of the hollow fiber membranes. The method of circulating the carrier gas on the secondary side surface of membranes is also exemplified. Among them, preference is given to the method of circulating the carrier gas on the secondary side surface of membranes and, in addition, it is preferred to have such a construction that the carrier gas flow is a countercurrent flow to the organic vapor mixture on both sides that sandwich the hollow fiber membranes.

The carrier gas is not particularly limited as long as the gas does not contain high permeable component or contains it at such a concentration that at least the partial pressure of the high permeable component is lower than that of the non-permeate gas, and for example, nitrogen, air and the like may be used. Since nitrogen less likely reverse-permeates from the secondary side to the primary side of the membrane and is inert, nitrogen is a preferred carrier gas also from the viewpoint of fire prevention. In addition, it is also preferred that a portion of the non-permeate gas from which the high permeable component has been separated is cycled to the supply inlet of the carrier gas for the use as the carrier gas.

In the bore feed-type gas separation membrane module, the carrier gas has a function to promote the permeation by flowing along the outside of the hollow fiber membranes. It is, therefore, preferred for the carrier gas to uniformly flow along the outside of the hollow fiber membranes without short paths.

In the method for separating the organic vapor mixture by the gas separation membrane module for organic vapor separation of the present invention, the organic vapor mixture (mixed gas) to be separate is not particularly limited as long as it is a mixture of two or more gases containing the vapor of organic compound. The method may be preferably used, for example, to separate water vapor from the mixed vapor of water vapor and organic vapor (dehydration of organic vapor) or to separate methanol from the mixed vapor of methanol and dimethyl carbonate.

The preferred organic compounds are those having boiling point not lower than 0° C. and not higher than 200° C. under the normal pressure. The reason that the boiling point of organic compound should be not lower than 0° C. and not higher than 200° C. is based on practical reason in considering the usage temperature range of the hollow fiber membrane, the facilities for superheating and vaporizing the organic vapor mixture, and the facilities for condensing and collecting the purified separated component and easiness in handling.

The organic compound having boiling point not lower than 0° C. and not higher than 200° C. under the normal pressure includes aliphatic alcohols such as methanol, ethanol, n-propanol, isopropanol, n-butanol, s-butanol, t-butanol, ethylene glycol; alicyclic alcohols such as cyclohexanol; aromatic alcohol such as benzyl alcohol; organic carboxylic acids such as formic acid, acetic acid, propionic acid, butyric acid; organic acid esters such as butyl acetate, ethyl acetate; ketones such as acetone, methyl ethyl ketone; cyclic ethers such as tetrahydrofuran, dioxane; organic amines such as butylamine, aniline, and the mixture of these compounds.

In the method for separating organic vapor mixture by the gas separation membrane module for organic vapor separation of the present invention, the organic vapor mixture is heated and vaporized by means of a vaporization (distillation) apparatus and the like, and it is supplied to the gas separation membrane module for organic vapor separation as the organic vapor mixture in a state under the normal pressure or in a pressurized state of 0.1 to atm (gauge pressure). The organic vapor mixture in a pressurized state may be directly obtained by a pressurized evaporator, or it may be obtained by pressurizing, by a vapor compressor, the organic vapor mixture under the normal pressure which has been obtained by a normal pressure evaporator.

It is also preferred that the organic vapor mixture is supplied as the organic vapor mixture superheated at sufficiently high temperature that does not cause condensation while being supplied to the gas separation membrane module for organic vapor separation, circulating inside the hollow fiber and being discharged from the non-permeate gas outlet.

The organic vapor mixture to be supplied to the gas separation membrane module for organic vapor separation of the present invention preferably has a temperature not lower than 80° C., more preferably not lower than 100° C. and yet preferably not lower than 120° C.

As the method for obtaining the superheated organic vapor mixture, it is specifically preferred to gasify the solution mixture containing the organic compound using a vaporization apparatus equipped with a heating device and at the same time to carry out the heating (superheating) treatment. The superheated organic vapor mixture may also be preferably obtained by carrying out the heating (superheating) treatment of the gasified organic vapor mixture by a heating device furnished separately.

As necessary, the treatment to reduce pressure may be carried out while keeping its temperature, then the organic vapor mixture may be supplied to the gas separation membrane module for organic vapor separation. The method of treatment for reducing pressure may be performed using usual pressure reducing valves and the like, or may be based on a treatment of the gasified gas mixture using a demister (mist separator) and the like to remove mist and at the same time to generate pressure loss.

The organic vapor mixture after the treatment becomes the gas mixture having pressure less than its saturation vapor pressure at the given temperature, and it is preferred to be supplied to the gas separation membrane module for organic vapor separation as retaining its state (specifically kept at the constant temperature). In doing so, the organic vapor mixture is not condensed while circulating inside the hollow fiber membrane and being discharged from the non-permeate gas outlet.

Among the organic substances, the present invention may be preferably used for dehydrating an aqueous solution containing alcohol, in particular may be preferably used for dehydrating an aqueous solution containing ethanol or isopropanol.

EXAMPLES

Hereafter, the present invention is explained by the examples; however, the present invention is not restricted by these examples.

The compounds used for the following examples are as follows.
(1) Epoxy compound (a1)
604: jER 604 made by Japan Epoxy Resins Co., Ltd., tetraglycidyldiaminodiphenylmethane, epoxy equivalent: 119
(2) Epoxy compound (a2)
630: jER 630 made by Japan Epoxy Resins Co., Ltd., triglycidylaminophenol, epoxy equivalent: 98
(3) Epoxy compound (a3)
828: jER 828 made by Japan Epoxy Resins Co., Ltd., bisphenol A-type epoxy compound in liquid form, epoxy equivalent: 189
806: jER 806 made by Japan Epoxy Resins Co., Ltd., bisphenol F-type epoxy compound in liquid form, epoxy equivalent: 165
1001: jER 1001 made by Japan Epoxy Resins Co., Ltd., bisphenol A-type epoxy compound, epoxy equivalent: 475
(4) Epoxy compound (a4)
152: jER 152 made by Japan Epoxy Resins Co., Ltd., phenol novolac-type epoxy compound, epoxy equivalent: 177
(5) Epoxy compound (a5)
4032: EPICLON HP-4032D made by DIC Corporation, naphthalene-type epoxy compound, epoxy equivalent: 142
(6) Epoxy compound (A)
742: Tactix 742 made by Huntsman Advanced Materials KK, tris(aminophenoxy)methane-type epoxy resin, epoxy equivalent: 160
(7) Aromatic amine compound (b1) 34DE: 3,4'-diaminodiphenyl ether, active hydrogen equivalent: 50
TPER: 1,3-bis(4-aminophenyl)propane, active hydrogen equivalent: 73
(8) Aromatic amine compound (b2)
BAPP: 2,2-bis(4-aminophenoxy(4-phenyl))propane, active hydrogen equivalent: 103
BAPS: 2,2-bis(4-aminophenoxy(4-phenyl)) sulfone, active hydrogen equivalent: 108
BAPB: 4,4'-bis(4-aminophenoxy)biphenyl, active hydrogen equivalent:
DA5MG: 1,5-bis(4-aminophenoxy)pentane, active hydrogen equivalent:
(9) Aromatic amine compound (B)
DDM: MDA-220 made by Mitsui Chemicals Polyurethanes, Co. Ltd, 4,4'-diaminodiphenylmethane, active hydrogen equivalent: 50
DDS: 4,4'-diaminodiphenyl sulfone, active hydrogen equivalent: 62
ASD: 4,4'-diaminodiphenyl sulfide, active hydrogen equivalent: 54
TPEQ: 1,4-bis(4-aminophenoxy)benzene, active hydrogen equivalent:
44DE: 4,4'-diaminodiphenyl ether, active hydrogen equivalent: 50

(Method for Making the Cured Material of Epoxy Composition)

The film formed by casting the casting resin composition which was obtained by uniformly mixing a given amount of the epoxy compounds and the hardener was cured by heating at 60° C. for 15 hours, at 110° C. for 5 hours and then at 180° C. for 4 hours to make the film having a thickness of about 100 μm consisting of the cured material of the epoxy composition.

When the epoxy compounds and the hardener were mixed, the mixing was made by using a solvent if necessary.

(Method for Measuring the Viscosity of the Casting Resin Composition)

The casting resin composition was given by mixing a given amount of the epoxy compounds and the hardener, which was stirred at room temperature for 10 minutes. The viscosity of the aforesaid casting resin composition was measured by using a rotational viscometer (E-type viscometer, Visconic EHD made by Tokyo Keiki Inc.) under a condition with a shear rate of rotor of 1.75 sec$^{-1}$ and at a temperature of 40° C.

(Method for Measuring the Glass Transition Temperature)

The film consisting of the cured material of the aforesaid epoxy composition was cut into a rectangular form having a width of about 2 mm and a length of about 40 mm to give a test specimen. The aforesaid test specimen was measured by using a dynamic solid viscoelasticity measuring instrument (RSA III made by TA Instruments) in the tensile mode (frequency 10 Hz) with the maximum strain of 0.2 to 1.0% under a nitrogen atmosphere. The glass transition temperature ($T_g$) was given by the peak-top of tan δ (loss modulus E"/storage modulus E').

In terms of the cured material of some epoxy compositions, the $T_g$ was found by converting the softening temperature obtained by a thermal mechanical analyzer (TMA) to the $T_g$ obtained by the dynamic viscoelastic measurement.

(Method for Measuring the Softening Temperature by a Thermal Mechanical Analyzer)

The film consisting of the cured material of the epoxy composition was cut into a rectangular form having a width of about 5 mm and a length of about 20 mm to give a test specimen. The aforesaid test specimen was measured by using a thermal mechanical analyzer (Thermo plus EVO TMA8310 made by Rigaku Corporation) in the tensile loading method (load 5 g) under the condition with a rate of temperature rise of 5° C./min. and a range of measurement temperature of 40 to 250° C. under a nitrogen atmosphere. On the obtained TMA curve, the tangent lines were drawn to the curve before and after a significant change in the coefficient of thermal expansion (CTE), and the softening temperature of the cured material of the epoxy composition was given by the temperature at the intersection point of the tangent lines.

(Method for Converting the Softening Temperature by a Thermal Mechanical Analyzer to the Glass Transition Temperature)

In terms of the cured material of some epoxy compositions, the relationship was found between the softening temperature obtained by the thermal mechanical analyzer and the $T_g$ obtained by the dynamic viscoelasticity measuring (the regression line obtained by the least-squares method). Then, the softening temperature of the epoxy composition with unknown $T_g$ was measured by the thermal mechanical analyzer, and the value in which the resultant softening temperature was converted in accordance with the regression line to the $T_g$ obtained by the dynamic viscoelastic measurement was substituted for the $T_g$ of the present invention.

(Method for Measuring the Elongation at Break, the Maximum Stress and the Young's Modulus)

The film consisting of the cured material of the aforesaid epoxy composition was cut into a rectangular form having a width of about 2 mm and a length of about 40 mm to give a test specimen. The aforesaid test specimen was measured for the tensile elongation at break, the maximum stress and the Young's modulus by using a tensile tester with a tensile rate of 2 mm/min. and a distance between chucks of 20 mm. The measurement was carried out under a condition with controlled humidity at a temperature of 23° C. and a humidity of 50% RH.

The elongation at break ($\epsilon_b$) under the standard condition in the atmosphere was given by the elongation at break measured after holding the aforesaid test specimen under the condition with controlled humidity for 10 hours or longer, the maximum stress ($\sigma_{max}$) under the standard condition in the atmosphere was given by the maximum stress done so, and the Young's modulus (E) under the standard condition in the atmosphere was given by the Young's modulus done so.

The elongation at break ($\epsilon_{b, S}$) in the state where the equilibrium swelling ratio has been achieved was given by the elongation at break measured immediately after immersing the aforesaid test specimen into ethanol at 130° C. for 120 hours in a closed vessel, the maximum stress ($\sigma_{max, S}$) in the state where the equilibrium swelling ratio has been achieved was given by the maximum stress done so, and the Young's modulus ($E_S$) in the state where the equilibrium swelling ratio has been achieved was given by the Young's modulus done so.

The minimum elongation at break was given by the smaller elongation at break among the elongation at break under the standard condition in the atmosphere and the elongation at break in the state where the equilibrium swelling ratio has been achieved.

(Method for Measuring the Elution Ratio)

The film consisting of the cured material of the aforesaid epoxy composition was cut into a rectangular form having a width of about 10 mm and a length of about 40 mm to give a sample, whose weight was measured in the state of drying at 120° C. for 72 hours in vacuum to give the weight before immersion. After immersing the aforesaid sample into ethanol at 130° C. for 120 hours in a closed vessel, the weight was measured in the state of drying at 120° C. for 72 hours in vacuum to give the weight after immersion. The value in which the difference between the weight before immersion and the weight after immersion of the sample was divided by the weight before immersion of the sample, and then the value was multiplied by 100 to give the elution ratio.

(Method for Measuring the Swelling Degree)

The film consisting of the cured material of the aforesaid epoxy composition was cut into a rectangular form having a width of about 10 mm and a length of about 40 mm to give a sample, whose weight was measured after the immersion within ethanol at 130° C. for 120 hours in a closed vessel to give the weight as swelling. The weight was measured in the state of drying at 120° C. for 72 hours in vacuum to give the weight after re-dried. The value in which the difference between the weight as swelling and the weight after re-dried of the sample was divided by the weight after re-dried of the sample, and then the value was multiplied by 100 to give the swelling degree.

Example 1

The casting resin composition was given by mixing the epoxy composition consisting of 68 parts by weight of jER604, 17 parts by weight of jER630 and 15 parts by weight of jER828 with 41 parts by weight of MDA-220. The viscosity of this casting resin composition at 40° C. in an uncured state was 56 Poises.

The film of the cured material of the epoxy composition was made by curing the casting resin composition. Table 2 shows the glass transition temperature ($T_g$), the elongation at break ($\epsilon_b$) under the standard condition in the atmosphere, the elongation at break ($\epsilon_{b, S}$) in the state where the equilibrium swelling ratio has been achieved, the maximum stress ($\sigma_{max}$) under the standard condition in the atmosphere, the maximum stress ($\sigma_{max, S}$) in the state where the equilibrium swelling ratio has been achieved, the Young's modulus (E) under the standard condition in the atmosphere, the Young's modulus ($E_S$) in the state where the equilibrium swelling ratio has been achieved, the elution ratio, and the swelling degree of the cured material of the aforesaid epoxy composition, which are measured in accordance with the aforesaid methods.

Examples 2 to 27

The film of the cured material of the epoxy composition was made by curing the casting resin composition having the composition shown in Table 1, which was evaluated as described in Example 1. Table 2 shows the results.

TABLE 1

| | Epoxy resin | | | | | | | Diamine | | | | | | | |
|---|---|---|---|---|---|---|---|---|---|---|---|---|---|---|---|
| | a1 | a2 | a3 | a3 | a3 | a4 | a5 | b1 | b1 | b2 | b2 | b2 | b2 | DDM | DDS |
| | 604 | 630 | 828 | 806 | 1001 | 152 | 4032D | 34DE | TPER | BAPP | BAPS | BAPB | DA5MG | | |
| Ex. 1 | 68 | 17 | 15 | | | | | | | | | | | | 41 |
| Ex. 2 | 63 | 27 | 10 | | | | | | | | | | | | 43 |
| Ex. 3 | 60 | 25 | 15 | | | | | | | | | | | | 42 |
| Ex. 4 | 56 | 24 | 20 | | | | | | | | | | | | 41 |
| Ex. 5 | 72 | 18 | 10 | | | | | | | | | | | | 42 |
| Ex. 6 | 51 | 34 | 15 | | | | | | | | | | | | 42 |
| Ex. 7 | 60 | | 40 | | | | | | | | | | | | 36 |
| Ex. 8 | | 60 | 40 | | | | | | | | | | | | 41 |
| Ex. 9 | 42 | 18 | 40 | | | | | | | | | | | | 37 |
| Ex. 10 | 25 | 60 | 15 | | | | | | | | | | | | 45 |
| Ex. 11 | | 85 | 15 | | | | | | | | | | | | 46 |
| Ex. 12 | 80 | | | 20 | | | | | | | | | | | 39 |
| Ex. 13 | 25 | 60 | | | 15 | | | | | | | | | | 42 |
| Ex. 14 | 42 | 18 | 40 | | | | | | | | | | | 46 | |
| Ex. 15 | 68 | 17 | 15 | | | | | 41 | | | | | | | |
| Ex. 16 | 80 | 20 | | | | | | 44 | | | | | | | |
| Ex. 17 | 50 | 50 | | | | | | 47 | | | | | | | |
| Ex. 18 | | 100 | | | | | | 51 | | | | | | | |
| Ex. 19 | 80 | 20 | | | | | | | 64 | | | | | | |
| Ex. 20 | | | | | | 100 | | 29 | | | | | | | |
| Ex. 21 | 50 | | | | | 50 | | 35 | | | | | | | |
| Ex. 22 | 80 | 20 | | | | | | | | 90 | | | | | |
| Ex. 23 | 80 | 20 | | | | | | | | | 81 | | | | |
| Ex. 24 | 80 | 20 | | | | | | | | | | 95 | | | |
| Ex. 25 | 80 | 20 | | | | | | | | | | | 63 | | |
| Ex. 26 | | | | | | | 100 | | | | | | | | 35 |
| Ex. 27 | 50 | | | | | | 50 | | | | | | | | 38 |

TABLE 2

| | $T_g$ [° C.] | $\epsilon_b$ [%] | $\epsilon_{b,S}$ [%] | Minimum elongation at break [%] | $\sigma_{max}$ [MPa] | $\sigma_{max,S}$ [MPa] | E [GPa] | $E_S$ [GPa] | Elution ratio [%] | Swelling degree [wt %] |
|---|---|---|---|---|---|---|---|---|---|---|
| Ex. 1 | 245 | 8.4 | 9.7 | 8.4 | 102.8 | 61.8 | 3.09 | 2.11 | 2.9 | 15.2 |
| Ex. 2 | 245 | 8.3 | 7.4 | 7.4 | 105.6 | 57.7 | 2.81 | 1.98 | 1.4 | 13.8 |
| Ex. 3 | 245 | 8.3 | 9.1 | 8.3 | 107.7 | 63.0 | 2.88 | 2.21 | 3.6 | 15.5 |
| Ex. 4 | 240 | 7.2 | 8.7 | 7.2 | 87.5 | 64.2 | 2.77 | 2.18 | 0.0 | 12.2 |
| Ex. 5 | 245 | 7.4 | 8.4 | 7.4 | 100.8 | 61.1 | 3.16 | 2.10 | 4.0 | 15.4 |
| Ex. 6 | 245 | 8.5 | 9.0 | 8.5 | 99.0 | 60.8 | 2.94 | 2.14 | 2.1 | 14.7 |
| Ex. 7 | 225 | 7.7 | 12.4 | 7.7 | 97.1 | 56.0 | 2.79 | 1.96 | 4.3 | 16.4 |
| Ex. 8 | 225 | 12.1 | 15.6 | 12.1 | 101.4 | 50.0 | 2.52 | 1.76 | 2.8 | 16.6 |
| Ex. 9 | 225 | 8.9 | 11.0 | 8.9 | 103.4 | 52.8 | 2.70 | 1.87 | 4.9 | 16.6 |
| Ex. 10 | 245 | 8.5 | 10.2 | 8.5 | 106.3 | 55.0 | 2.86 | 1.89 | 2.9 | 15.8 |
| Ex. 11 | 240 | 9.2 | 9.2 | 9.2 | 106.1 | 52.8 | 2.87 | 1.89 | 1.3 | 14.8 |
| Ex. 12 | 235 | 8.9 | 9.8 | 8.9 | 103.5 | 61.2 | 3.08 | 1.86 | 2.6 | 14.6 |
| Ex. 13 | 245 | 9.2 | 7.4 | 7.4 | 100.2 | 53.4 | 2.50 | 1.99 | 2.2 | 15.0 |
| Ex. 14 | 220 | 7.8 | 13.1 | 7.8 | 101.4 | 49.1 | 3.15 | 1.83 | 0.7 | 16.2 |
| Ex. 15 | 220 | 8.3 | 7.1 | 7.1 | 109.4 | 59.6 | 3.30 | 2.29 | 0.0 | 15.2 |
| Ex. 16 | 235 | 8.0 | 7.0 | 7.0 | 109.4 | 69.5 | 3.36 | 2.46 | 0.0 | 13.1 |
| Ex. 17 | 235 | 7.5 | 7.5 | 7.5 | 102.7 | 61.2 | 3.47 | 2.33 | 0.0 | 13.0 |
| Ex. 18 | 235 | 9.3 | 7.3 | 7.3 | 110.9 | 62.5 | 3.58 | 2.38 | 0.0 | 12.1 |
| Ex. 19 | 200 | 8.3 | 8.3 | 8.3 | 99.7 | 60.4 | 3.14 | 2.26 | 0.5 | 14.8 |
| Ex. 20 | 170* | 9.7 | 13.3 | 9.7 | 106.1 | 45.4 | 3.16 | 1.88 | 2.2 | 15.3 |
| Ex. 21 | 190* | 9.2 | 8.6 | 8.6 | 113.9 | 61.5 | 3.18 | 2.10 | 0.5 | 13.5 |
| Ex. 22 | 210 | 7.8 | 7.8 | 7.8 | 99.9 | 55.3 | 3.07 | 1.95 | 2.6 | 16.1 |
| Ex. 23 | 220* | 7.5 | 7.4 | 7.4 | 100.2 | 57.2 | 3.13 | 2.02 | 2.0 | 13.3 |
| Ex. 24 | 190* | 8.2 | 7.8 | 7.8 | 101.0 | 58.6 | 3.10 | 2.03 | 1.1 | 15.2 |
| Ex. 25 | 210 | 7.7 | 10.4 | 7.7 | 80.9 | 46.5 | 2.52 | 1.48 | 2.3 | 14.3 |

TABLE 2-continued

| | $T_g$ [° C.] | $\epsilon_b$ [%] | $\epsilon_{b,S}$ [%] | Minimum elongation at break [%] | $\sigma_{max}$ [MPa] | $\sigma_{max,S}$ [MPa] | E [GPa] | $E_S$ [GPa] | Elution ratio [%] | Swelling degree [wt %] |
|---|---|---|---|---|---|---|---|---|---|---|
| Ex. 26 | 200 | 11.4 | 9.4 | 9.4 | 110.4 | 55.6 | 2.55 | 2.03 | 0.9 | 15.2 |
| Ex. 27 | 225 | 7.6 | 7.9 | 7.6 | 98.8 | 55.9 | 2.74 | 1.99 | 0.9 | 13.9 |

(Notes for Table 2)
$T_g$: glass transition temperature [° C.] estimated by the solid dynamic viscoelastic measurement. In regard for numerical values marked with an asterisk(*), the value was substituted in which the softening temperature estimated by the thermal mechanical analyzer was converted to the glass transition temperature obtained from the solid dynamic viscoelastic measurement.
$\epsilon_b$: the elongation at break [%] in the atmosphere at 23° C. and 50 RH.
$\epsilon_{b,S}$: the elongation at break [%] in the state where the equilibrium swelling ratio has been achieved.
Minimum elongation at break: the smaller elongation [%] among $\epsilon_b$ and $\epsilon_{b,S}$.
$\sigma_{max}$: the maximum stress [MPa] in the atmosphere at 23° C. and 50 RH.
$\sigma_{max,S}$: the maximum stress [MPa] in the state where the equilibrium swelling ratio has been achieved.
E: the Young's modulus [GPa] in the atmosphere at 23° C. and 50 RH.
$E_S$: the Young's modulus [GPa] in the state where the equilibrium swelling ratio has been achieved.
Elution ratio: the ratio of weight loss [%] during the immersion within ethanol at 130° C. for 120 hours.
Swelling degree: the ratio of weight increase [%] during the immersion within ethanol at 130° C. for 120 hours.

Comparative Examples 1 to 14

The film of the cured material of the epoxy composition was made by curing the casting resin composition having the composition shown in Table 3, which was evaluated as described in the example 1. Table 4 shows the results.

TABLE 3

| | Epoxy resin | | | | Diamine | | | |
|---|---|---|---|---|---|---|---|---|
| | a1 604 | a2 630 | a3 828 | 742 | b1 34DE | DDM | ASD | 44DE |
| Comparative ex. 1 | 100 | | | | 42 | | | |
| Comparative ex. 2 | 90 | 10 | | | 43 | | | |
| Comparative ex. 3 | 80 | 20 | | | 44 | | | |
| Comparative ex. 4 | 70 | 30 | | | 44 | | | |
| Comparative ex. 5 | 50 | 50 | | | 46 | | | |
| Comparative ex. 6 | | 100 | | | 51 | | | |
| Comparative ex. 7 | 67 | 28 | 5 | | 44 | | | |
| Comparative ex. 8 | | | 100 | | 26 | | | |
| Comparative ex. 9 | 28 | 12 | 60 | | 34 | | | |
| Comparative ex. 10 | 100 | | | | | 42 | | |
| Comparative ex. 11 | | | 100 | | | 26 | | |
| Comparative ex. 12 | 80 | 20 | | | | | | 44 |
| Comparative ex. 13 | 80 | 20 | | | | | 53 | |
| Comparative ex. 14 | | | | 100 | 31 | | | |

TABLE 4

| | $T_g$ [° C.] | $\epsilon_b$ [%] | $\epsilon_{b,S}$ [%] | Minimum elongation at break [%] | $\sigma_{max}$ [MPa] | $\sigma_{max,S}$ [MPa] | E [GPa] | $E_S$ [GPa] | Elution ratio [%] | Swelling degree [wt %] |
|---|---|---|---|---|---|---|---|---|---|---|
| Comparative ex. 1 | 250 | 5.1 | 8.4 | 5.1 | 99.1 | 65.7 | 2.82 | 1.90 | 3.9 | |
| Comparative ex. 2 | 250 | 7.2 | 6.4 | 6.4 | 111.2 | 60.8 | 2.91 | 2.06 | 0.0 | 12.8 |
| Comparative ex. 3 | 250 | 6.5 | 6.4 | 6.4 | 103.1 | 63.4 | 2.88 | 2.20 | 0.6 | 13.4 |
| Comparative ex. 4 | 250 | 6.6 | 7.5 | 6.6 | 102.4 | 55.9 | 2.90 | 1.78 | 4.2 | 15.4 |
| Comparative ex. 5 | 250 | 7.5 | 6.6 | 6.6 | 107.1 | 56.1 | 2.93 | 1.97 | 0.0 | 12.2 |
| Comparative ex. 6 | 250 | 5.7 | | 5.7 | 95.2 | | 2.83 | | 0.9 | |
| Comparative ex. 7 | 250 | 7.5 | 6.7 | 6.7 | 105.7 | 62.1 | 3.02 | 2.24 | 0.0 | 13.3 |
| Comparative ex. 8 | 170 | 9.0 | 10.9 | 9.0 | 90.0 | 34.0 | 2.55 | 1.61 | 15.6 | 20.2 |
| Comparative ex. 9 | 210 | 11.0 | 11.4 | 11.0 | 89.7 | 46.5 | 2.45 | 1.78 | 5.0 | 17.2 |
| Comparative ex. 10 | 235 | 7.3 | 5.3 | 5.3 | 106.9 | 59.3 | 2.45 | 2.28 | 0.0 | 14.5 |
| Comparative ex. 11 | | 8.0 | 10.5 | 8.0 | 90.4 | 32.9 | 2.84 | 1.62 | 5.6 | 19.1 |

TABLE 4-continued

|  | $T_g$ [° C.] | $\epsilon_b$ [%] | $\epsilon_{b,S}$ [%] | Minimum elongation at break [%] | $\sigma_{max}$ [MPa] | $\sigma_{max,S}$ [MPa] | E [GPa] | $E_S$ [GPa] | Elution ratio [%] | Swelling degree [wt %] |
|---|---|---|---|---|---|---|---|---|---|---|
| Comparative ex. 12 |  | 5.2 |  | 5.2 | 83.7 |  | 3.36 |  |  |  |
| Comparative ex. 13 |  | 3.5 |  | 3.5 | 64.4 |  | 3.27 |  |  |  |
| Comparative ex. 14 |  | 5.4 |  |  | 94.1 |  | 3.55 |  |  |  |

(Notes for Table 4)
$T_g$: glass transition temperature [° C.] estimated by the solid dynamic viscoelastic measurement.
$\epsilon_b$: the elongation at break [%] under the standard state in the atmosphere.
$\epsilon_{b,S}$: the elongation at break [%] in the state where the equilibrium swelling ratio has been achieved.
Minimum elongation at break: the smaller elongation [%] among $\epsilon_b$ and $\epsilon_{b,S}$.
$\sigma_{max}$: the maximum stress [MPa] under the standard state in the atmosphere.
$\sigma_{max,S}$: the maximum stress [MPa] in the state where the equilibrium swelling ratio has been achieved.
E: the Young's modulus [GPa] under the standard state in the atmosphere.
$E_S$: the Young's modulus [GPa] in the state where the equilibrium swelling ratio has been achieved.
Elution ratio: the ratio of weight loss [%] during the immersion in ethanol at 130° C. for 120 hours.
Swelling degree: the ratio of weight increase [%] during the immersion in ethanol at 130° C. for 120 hours.

Comparative Example 15

For the casting resin composition having the composition of the epoxy composition consisting of 80 parts by weight of jER604, 20 parts by weight of jER630 and 64 parts by weight of 1,4-bis(4-aminophenoxy)propane, the epoxy composition and the hardener were not completely mixed, which did not allow for the uniform cured material.

Example 28

At both end parts of the fiber bundle of bundling the polyimide hollow fiber membranes (membrane area: ca 100 m²), tube sheets were made by curing the epoxy composition consisting of 68 parts by weight of jER604, 17 parts by weight of jER630 and 15 parts by weight of jER828 using 41 parts by weight of MDA-220 to make the hollow fiber element for organic vapor separation. For the cured material of the aforesaid epoxy composition, the glass transition temperature was 245° C., the minimum elongation at break was 8.4% and the elution ratio was 2.9%. The dehydration of ethanol was carried out by using the gas separation membrane module for organic vapor separation having the configuration of FIG. 1 which has housed the aforesaid hollow fiber element. The solution containing 80% by weight of ethanol and 20% by weight of water was heated to give the organic vapor mixture at 133° C. and 0.4 MPa (G), which was supplied to the gas separation membrane module to carry out the operation of the dehydration.

In the dehydration operation with the separation membrane module, the dehydration operation of the mixed gas was carried out by evacuating the permeate side of the hollow fiber membrane to 12 kPa(A) together with circulating a portion of dried ethanol vapor (carrier gas) outside the hollow fiber membrane (around the hollow fiber, permeate side), which allowed the water vapor in the mixed gas to selectively permeate the membrane and to be separated. The permeate vapor and non-permeate vapor of the separation membrane module were cooled down and condensed to give the condensed liquids of the permeate vapor and non-permeate vapor, which were collected. After cessation of the operation of a continuous run for 24 hours, no crack or the like at all was found by visually confirming the appearance of the tube sheet, which was in good. Also, the change of the separation performance was not observed during the operation of the module.

Comparative Example 16

At both end parts of the fiber bundle of bundling the polyimide hollow fiber membranes (membrane area: ca 100 m²), tube sheets were made by curing the epoxy composition consisting of 80 parts by weight of jER604 and 20 parts by weight of jER630 by using 44 parts by weight of MDA-220 to make the hollow fiber element for organic vapor separation. For the cured material of the aforesaid epoxy composition, the glass transition temperature was 250° C., the minimum elongation at break was 6.4% and the elution ratio was 2.9%. The dehydration of ethanol was carried out by using the gas separation membrane module for organic vapor separation having the configuration of FIG. 1 which has housed the aforesaid hollow fiber element. The solution containing 80% by weight of ethanol and 20% by weight of water was heated to give the organic vapor mixture at 133° C. and 0.4 MPa (G), which was supplied to the gas separation membrane module to carry out the operation of the dehydration.

In the dehydration operation with the separation membrane module, the dehydration operation of the mixed gas was carried out by evacuating the permeate side of the hollow fiber membrane to 12 kPa(A) together with circulating a portion of dried ethanol vapor (carrier gas) outside the hollow fiber membrane (around the hollow fiber, permeate side), which allowed the water vapor in the mixed gas to selectively permeate the membrane and to be separated. The permeate vapor and non-permeate vapor of the separation membrane module were cooled down and condensed to give the condensed liquids of the permeate vapor and non-permeate vapor, which were collected. After cessation of the operation of a continuous run for 24 hours, the emergence of microcracks in a part of the tube sheet was found by visually confirming the appearance of the tube sheet.

INDUSTRIAL APPLICABILITY

The use of the hollow fiber element for organic vapor separation and the gas separation membrane module for organic vapor separation of the present invention enables the effective separation of organic vapor while retaining its gas-tightness even under a condition at an elevated temperature and high pressure and maintaining its performance for the separation in organic vapor separation.

EXPLANATION FOR NUMERICAL ITEMS

1 Mixed gas inlet
2 Carrier gas inlet
3 Permeate gas outlet
4 Non-permeate gas outlet 5 Cylindrical vessel
6 Hollow fiber bundle
6a Hollow fiber membrane
7 Tube sheet
7a First tube sheet
7b Second tube sheet
8 Carrier gas guide film
9 Core tube
10 Connecting hole of core tube
11 Mold

The invention claimed is:

1. A hollow fiber element constituting a separation membrane module for separating an organic vapor, in which at least one end part of a fiber bundle consisting of multiple hollow fiber membranes having a selective permeability is fixed and bound with a tube sheet formed by a cured material, in which an epoxy composition (A) has been cured by using a hardener (B), wherein
 a glass transition temperature of the cured material is not less than 160° C., a minimum elongation at break thereof is not less than 7.0%, and an elution ratio thereof is less than 5%, and
 the epoxy composition (A) comprises:
  an epoxy compound (a1) represented by the following chemical formula (a1) and/or an epoxy compound (a2) which is triglycidyl-4-aminophenol represented by the following chemical formula (a2), and an epoxy compound (a3) represented by the following chemical formula (a3); and wherein
  an amount of the epoxy compound (a3) in the epoxy composition (A) is 7 to 50% by weight, and
  a total amount of the epoxy compound (a1), the epoxy compound (a2) and the epoxy compound (a3) in the epoxy composition (A) is not less than 80% by weight;

Chemical formula (a1)

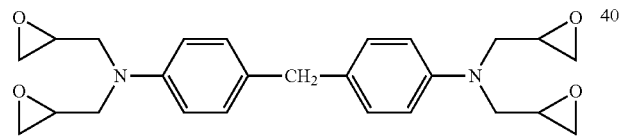

Chemical formula (a2)

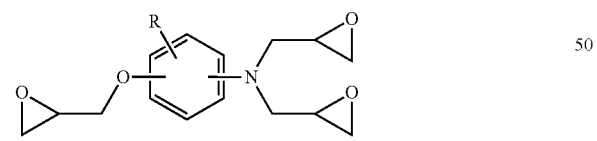

in which R denotes hydrogen atom;

in which R' denotes alkyl group having 1 to 3 carbon atoms, fluorinated alkyl group having 1 to 3 carbon atoms or hydrogen atom, and n denotes an integer of 0 to 20.

2. A hollow fiber element constituting a separation membrane module for separating an organic vapor, in which at least one end part of a fiber bundle consisting of multiple hollow fiber membranes having a selective permeability is fixed and bound with a tube sheet formed by a cured material, in which an epoxy composition (A) has been cured by using a hardener (B), wherein
 a glass transition temperature of the cured material is not less than 160° C., a minimum elongation at break thereof is not less than 7.0%, and an elution ratio thereof is less than 5%, wherein the epoxy composition (A) comprises an epoxy compound (a2) which is triglycidyl-4-aminophenol represented by the following chemical formula (a2), and wherein the hardener (B) is an aromatic amine compound (b1) represented by the following chemical formula (b1);

Chemical formula (a2)

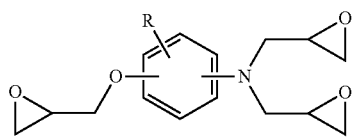

in which R denotes hydrogen atom;

Chemical formula (b1)

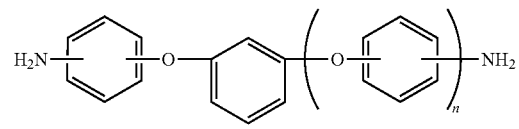

in which n denotes an integer of 0 to 3.

3. A hollow fiber element constituting a separation membrane module for separating an organic vapor, in which at least one end part of a fiber bundle consisting of multiple hollow fiber membranes having a selective permeability is fixed and bound with a tube sheet formed by a cured material, in which an epoxy composition (A) has been cured by using a hardener (B), wherein
 a glass transition temperature of the cured material is not less than 160° C., a minimum elongation at break thereof is not less than 7.0%, and an elution ratio thereof is less than 5%, wherein the epoxy composition (A) comprises an epoxy compound (a4) represented by the following chemical formula (a4), and wherein the hardener (B) is an aromatic amine compound (b1) represented by the following chemical formula (b1);

Chemical formula (a3)

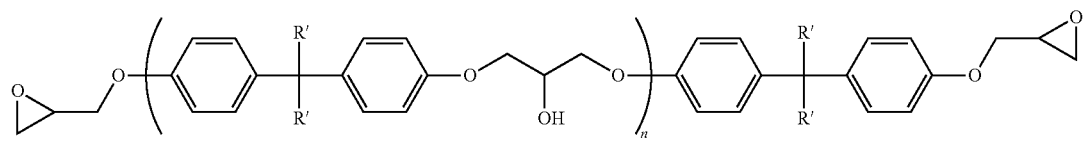

Chemical formula (a4)

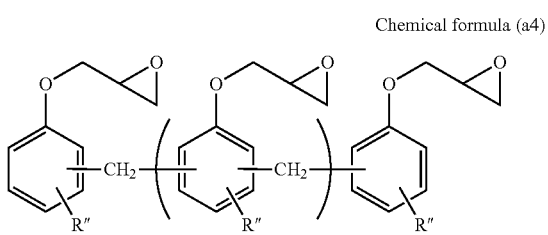

in which R″ denotes methyl group or hydrogen atom, and n denotes an integer of 0 to 500;

Chemical formula (b1)

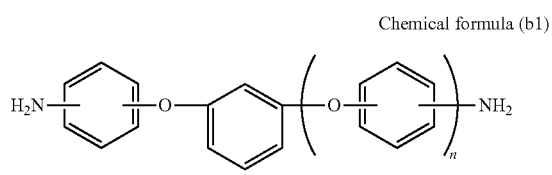

in which n denotes an integer of 0 to 3.

4. The hollow fiber element constituting a separation membrane module for separating an organic vapor according to claim 1, wherein the hardener (B) comprises at least one selected from the group consisting of 2,4-diaminotoluene, p-phenylenediamine, phenylenediamine, alkyl 3,5-diamino-4-chlorobenzoate ester, 4,4'-diaminodiphenylmethane, 3,3'-dichloro-4,4'-diaminodiphenylmethane, 3,3'-dimethyl-4,4'-diaminodiphenylmethane, 3,3'-diethyl-4,4'-diaminodiphenylmethane, 4,4'-diaminodiphenyl sulfone, 3,3'-dichloro-4,4'-diaminodiphenyl sulfone, 3,3'-dimethyl-4,4'-diaminodiphenyl sulfone, 3,3'-diethyl-4,4'-diaminodiphenyl sulfone, 4,4'-diaminodiphenyl ether, 3,3'-dichloro-4,4'-diaminodiphenyl ether, 3,3'-dimethyl-4,4'-diaminodiphenyl ether, 3,3'-diethyl-4,4'-diaminodiphenyl ether, 3,4'-diaminodiphenyl ether and the modified aromatic amine compounds in which these are modified.

5. The hollow fiber element constituting a separation membrane module for separating an organic vapor according to claim 1, wherein the hardener (B) comprises at least one selected from the group consisting of 4,4'-diaminodiphenylmethane and 3,4'-diaminodiphenyl ether.

6. The hollow fiber element constituting a separation membrane module for separating an organic vapor according to claim 2, wherein a content of the epoxy compound (a2) which is triglycidyl-4-aminophenol represented by the chemical formula (a2) in the epoxy composition (A) is not less than 10% by weight.

7. The hollow fiber element constituting a separation membrane module for separating an organic vapor according to claim 2, wherein the aromatic amine compound (b1) comprises at least one selected from the group consisting of 3,4'-diaminodiphenyl ether and 1,3-bis(4-aminophenoxy)benzene.

8. The hollow fiber element constituting a separation membrane module for separating an organic vapor according to claim 3, wherein a content of the epoxy compound (a4) in the epoxy composition (A) is not less than 10% by weight.

9. The hollow fiber element constituting a separation membrane module for separating an organic vapor according to claim 3, wherein the aromatic amine compound (b1) comprises at least one selected from the group consisting of 3,4'-diaminodiphenyl ether and 1,3-bis(4-aminophenoxy)benzene.

* * * * *